United States Patent [19]
Kondo et al.

[11] Patent Number: 5,640,202
[45] Date of Patent: Jun. 17, 1997

[54] IMAGING SYSTEM WHICH CHANGES THE FRAME RATE OF THE IMAGE SIGNAL

[75] Inventors: Hiroshi Kondo, Kawasaki; Masao Suzuki, Tokyo, both of Japan

[73] Assignee: Canon Kabushiki Kaisha, Tokyo, Japan

[21] Appl. No.: 426,973

[22] Filed: Apr. 24, 1995

[30] Foreign Application Priority Data

Apr. 26, 1994 [JP] Japan .................................. 6-088594
May 23, 1994 [JP] Japan .................................. 6-108445

[51] Int. Cl.$^6$ ........................................................ H04N 5/228
[52] U.S. Cl. ........................... 348/222; 348/232; 348/233; 348/239; 358/909.1
[58] Field of Search ................... 348/222, 231–233, 348/239, 240, 459; 358/909.1, 906; H04N 5/288, 5/76

[56] References Cited

U.S. PATENT DOCUMENTS 4,905,091  2/1990  Suzuki et al. ........................ 358/296
5,337,154  8/1994  Dorricott .............................. 348/459

*Primary Examiner*—Sherrie Hsia
*Attorney, Agent, or Firm*—Fitzpatrick, Cella, Harper & Scinto

[57] ABSTRACT

An image signal obtained by an image pickup device is input to a signal processing apparatus. A frame rate of the input image signal is changed and a changing operation is controlled in the signal processing apparatus. Thus, a frame rate upon recording of the image signal can be change in accordance with an application for the image. By providing a function such as a changing operation of the frame rate for the signal processing apparatus, the size and cost of the image pickup device is minimized, while an expansion of the function and a change in performance in which the recording and reproduction of an image are set to fundamental operations can easily be performed.

27 Claims, 20 Drawing Sheets

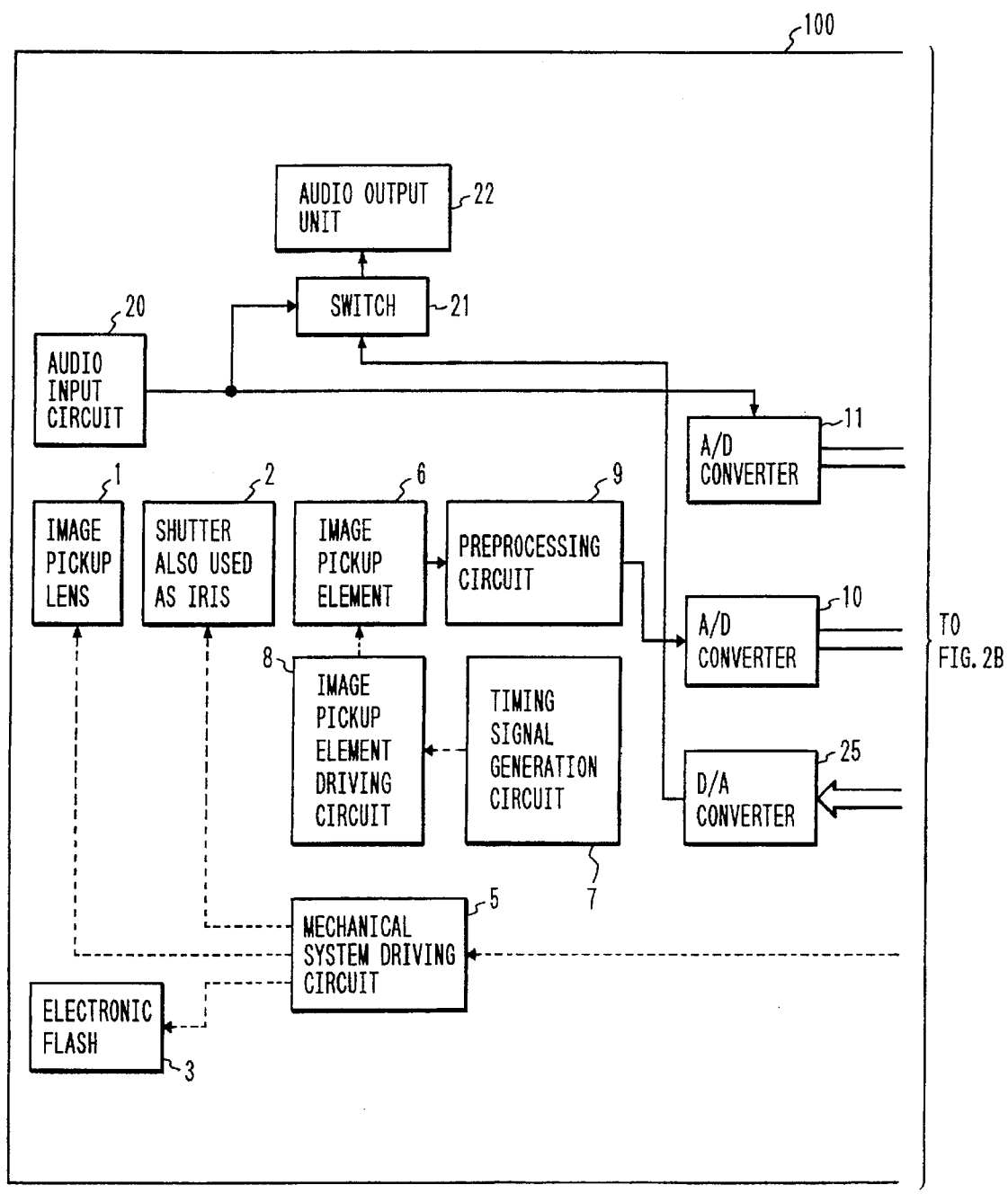

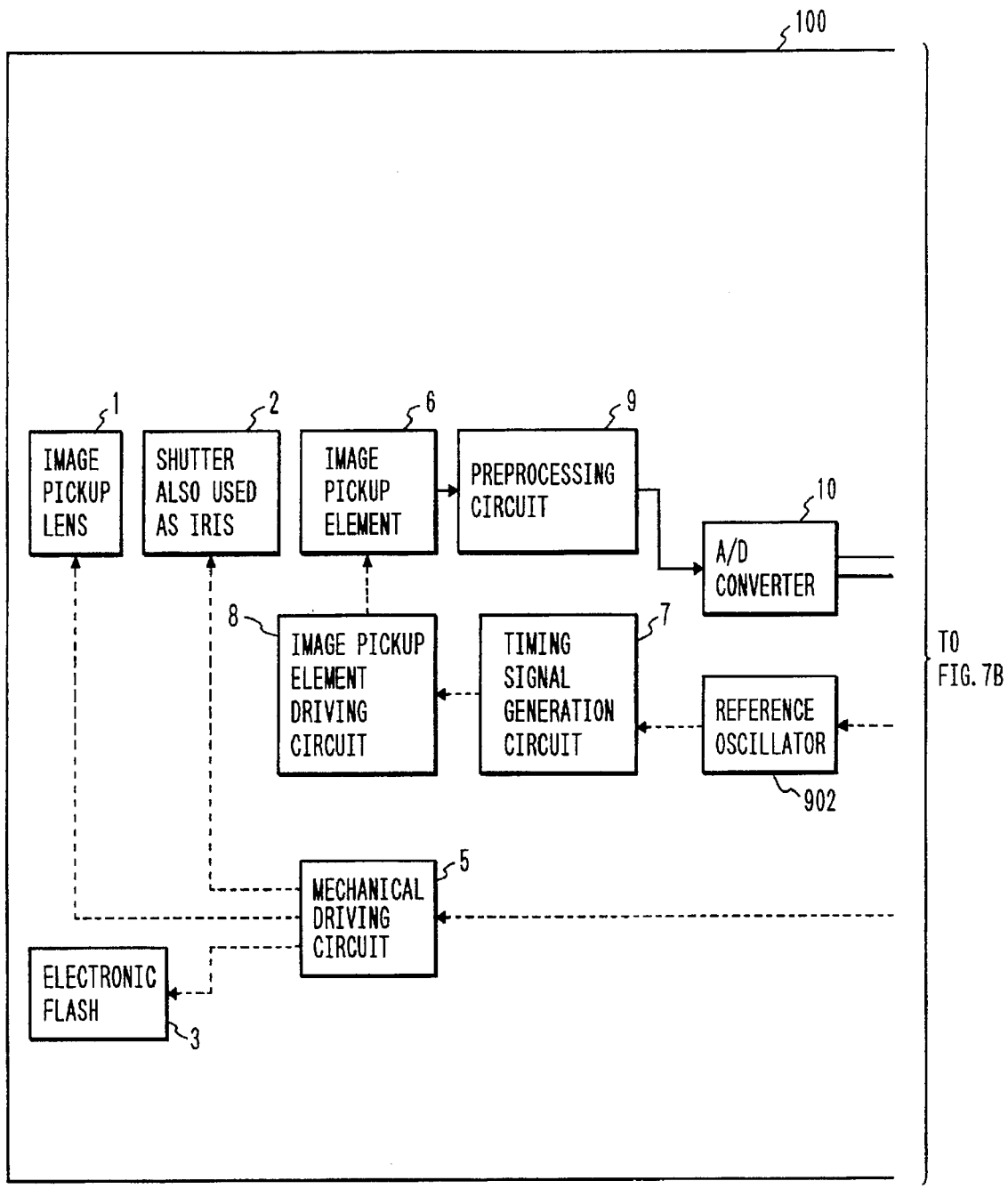

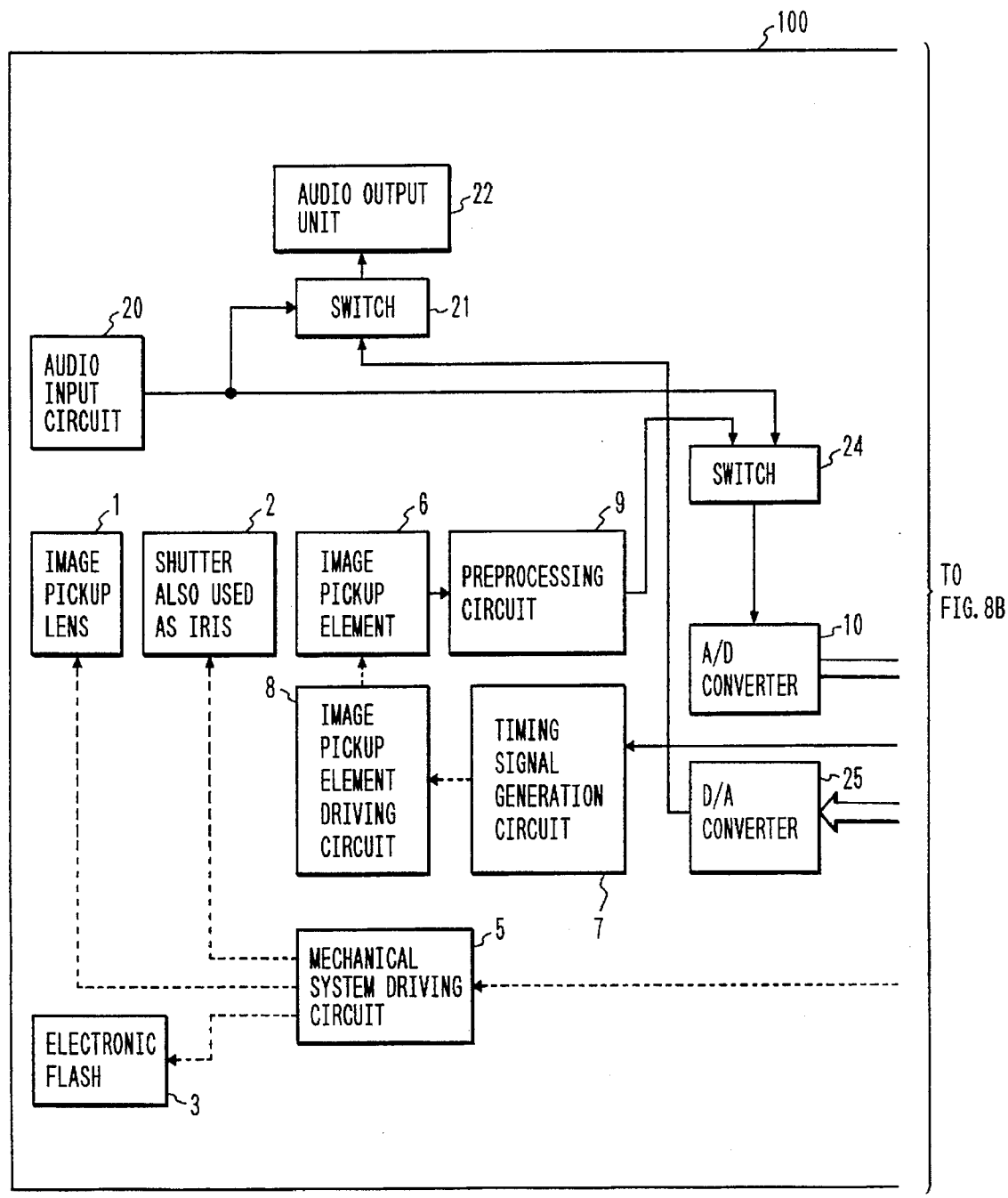

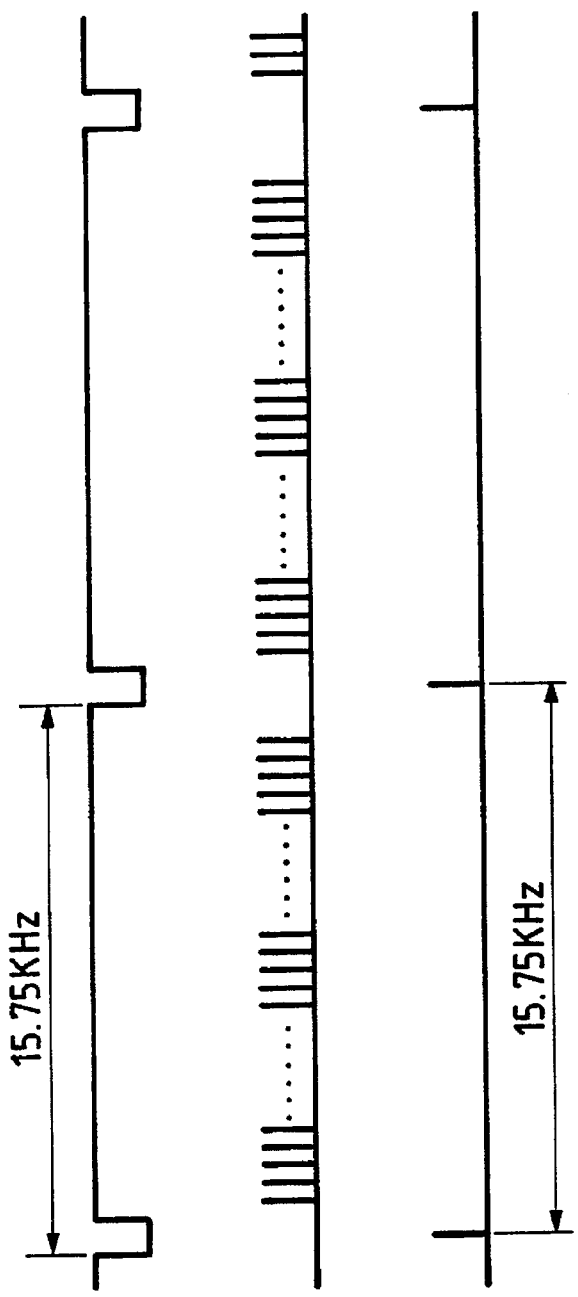

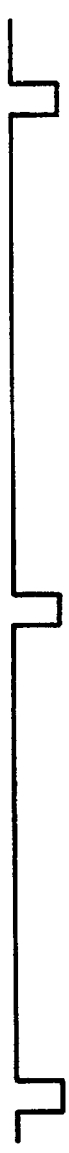
FIG. 11A  VIDEO SIGNAL VERTICAL SYNC. SIGNAL
FIG. 11B  VIDEO SIGNAL HORIZONTAL SYNC. SIGNAL
FIG. 11C  TRANSFER PERIOD OF AUDIO PICKED UP AT PHOTOGRAPHING
FIG. 11D  TRANSFER PERIOD OF ADDITIONAL AUDIO IN REPRODUCTION

FIG. 12

| | | | |
|---|---|---|---|
| (1) | HEADER SIGNAL | AUDIO SIGNAL (FOR ADDITION) | HEADER SIGNAL | IMAGE SIGNAL (FOR 1H) |
| (2) | HEADER SIGNAL | AUDIO SIGNAL (FOR ADDITION) | HEADER SIGNAL | IMAGE SIGNAL (FOR 1H) |
| (3) | HEADER SIGNAL | AUDIO SIGNAL (FOR ADDITION) | HEADER SIGNAL | IMAGE SIGNAL (FOR 1H) |
| (4) | ⋮ | ⋮ | ⋮ | ⋮ |
| (5) | HEADER SIGNAL | AUDIO SIGNAL (FOR ADDITION) | HEADER SIGNAL | IMAGE SIGNAL (FOR 1H) |
| (6) | HEADER SIGNAL | AUDIO SIGNAL (FOR ADDITION) | HEADER SIGNAL | IMAGE SIGNAL (FOR 1H) |
| (7) | HEADER SIGNAL | AUDIO SIGNAL (FOR ADDITION) | HEADER SIGNAL | IMAGE SIGNAL (FOR 1H) |
| (8) | HEADER SIGNAL | AUDIO SIGNAL (RECORDED AT PHOTOGRAPHING) | | |

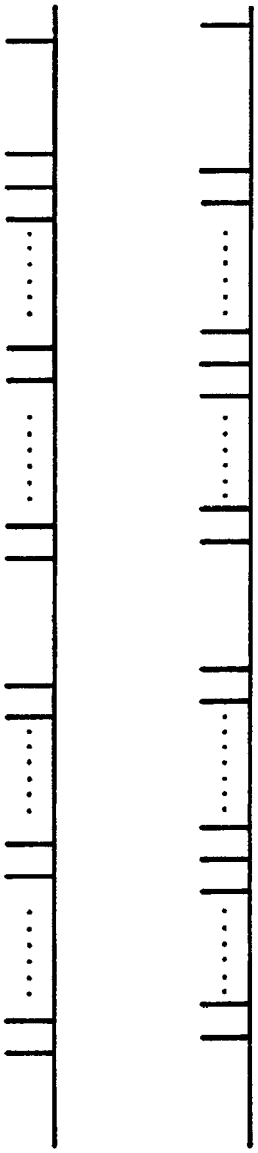
FIG. 13A  D/A TIMING
FIG. 13B  OUTPUT TIMING OF AUDIO RECORDED AT PHOTOGRAPHING, TO D/A CONVERTER
FIG. 13C  OUTPUT TIMING OF AUDIO ADDED AFTER PHOTOGRAPHING, TO D/A CONVERTER

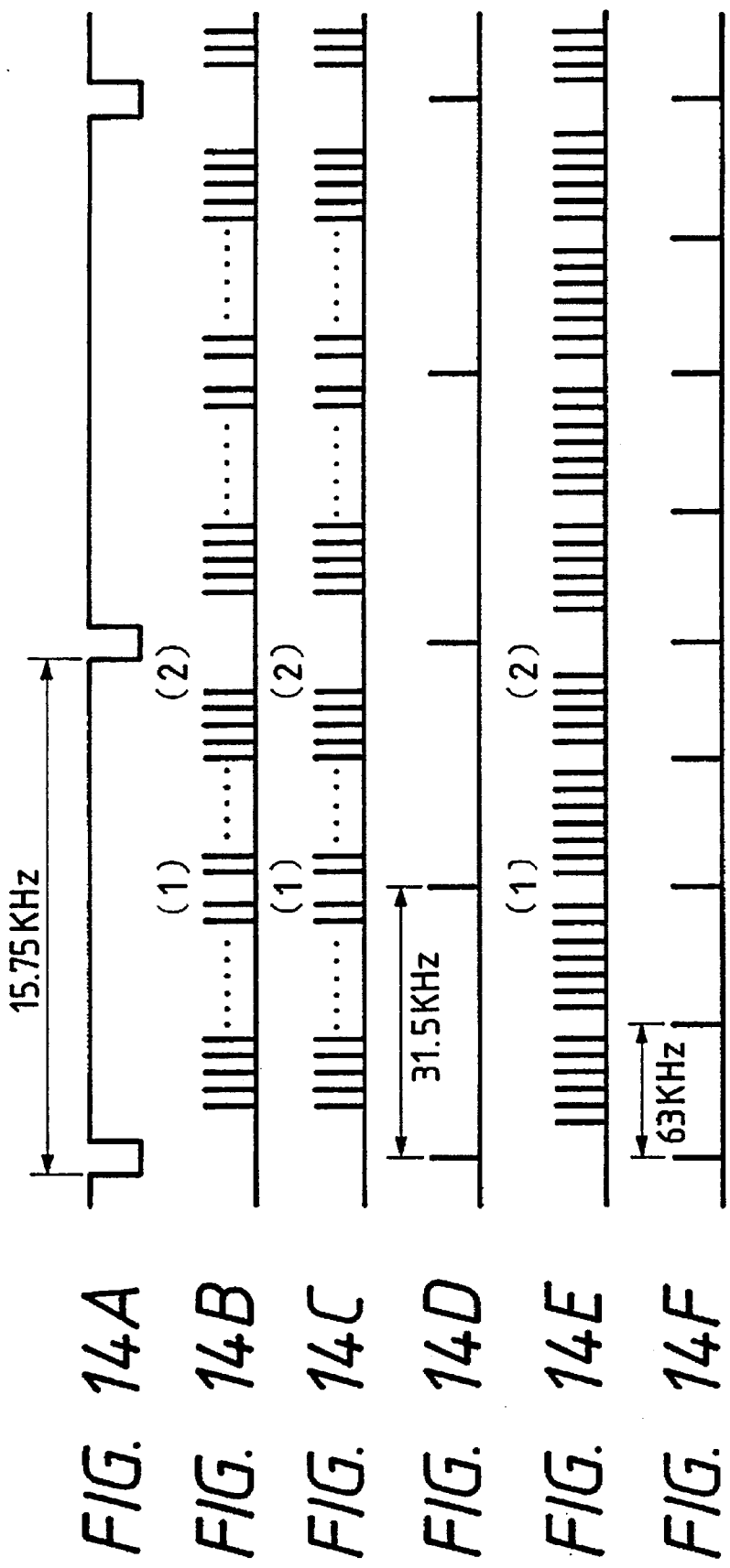

FIG. 15

| HEADER SIGNAL | IMAGE SIGNAL (FOR 1H) | HEADER SIGNAL | IMAGE SIGNAL (FOR 1H) |
|---|---|---|---|
| HEADER SIGNAL | IMAGE SIGNAL (FOR 1H) | HEADER SIGNAL | IMAGE SIGNAL (FOR 1H) |
| HEADER SIGNAL | IMAGE SIGNAL (FOR 1H) | HEADER SIGNAL | IMAGE SIGNAL (FOR 1H) |
| HEADER SIGNAL | IMAGE SIGNAL (FOR 1H) | HEADER SIGNAL | IMAGE SIGNAL (FOR 1H) |
| HEADER SIGNAL | IMAGE SIGNAL (FOR 1H) | HEADER SIGNAL | IMAGE SIGNAL (FOR 1H) |
| HEADER SIGNAL | IMAGE SIGNAL (FOR 1H) | HEADER SIGNAL | IMAGE SIGNAL (FOR 1H) |
| HEADER SIGNAL | AUDIO SIGNAL (FOR ADDITION) | | |
| HEADER SIGNAL | AUDIO SIGNAL (RECORDED AT PHOTOGRAPHING) | | |

FIG. 16

| HEADER SIGNAL | ID SIGNAL (FOR IMAGE) | HEADER SIGNAL | IMAGE SIGNAL (FOR 1H) |
|---|---|---|---|
| HEADER SIGNAL | IMAGE SIGNAL (FOR 1H) | HEADER SIGNAL | IMAGE SIGNAL (FOR 1H) |
| HEADER SIGNAL | IMAGE SIGNAL (FOR 1H) | HEADER SIGNAL | IMAGE SIGNAL (FOR 1H) |
| HEADER SIGNAL | IMAGE SIGNAL (FOR 1H) | HEADER SIGNAL | IMAGE SIGNAL (FOR 1H) |
| HEADER SIGNAL | IMAGE SIGNAL (FOR 1H) | HEADER SIGNAL | IMAGE SIGNAL (FOR 1H) |
| HEADER SIGNAL | IMAGE SIGNAL (FOR 1H) | HEADER SIGNAL | IMAGE SIGNAL (FOR 1H) |
| HEADER SIGNAL | ID SIGNAL (FOR ADDITIONAL AUDIO) | AUDIO SIGNAL (FOR ADDITION) | |
| HEADER SIGNAL | ID SIGNAL (FOR AUDIO RECORDED AT PHOTOGRAPHING) | AUDIO SIGNAL (RECORDED AT PHOTOGRAPHING) | |

FIG. 17

| HEADER SIGNAL | ID SIGNAL (FOR IMAGE) | HEADER SIGNAL | IMAGE SIGNAL (FOR 1H) |
|---|---|---|---|
| HEADER SIGNAL | IMAGE SIGNAL (FOR 1H) | HEADER SIGNAL | IMAGE SIGNAL (FOR 1H) |
| HEADER SIGNAL | IMAGE SIGNAL (FOR 1H) | HEADER SIGNAL | IMAGE SIGNAL (FOR 1H) |
| HEADER SIGNAL | IMAGE SIGNAL (FOR 1H) | HEADER SIGNAL | IMAGE SIGNAL (FOR 1H) |
| HEADER SIGNAL | IMAGE SIGNAL (FOR 1H) | HEADER SIGNAL | IMAGE SIGNAL (FOR 1H) |
| HEADER SIGNAL | ID SIGNAL (FOR ADDITIONAL AUDIO) | AUDIO SIGNAL (FOR ADDITION) | |
| HEADER SIGNAL | ID SIGNAL (FOR ADDITIONAL AUDIO) | AUDIO SIGNAL (FOR ADDITION) | |
| HEADER SIGNAL | ID SIGNAL (FOR AUDIO RECORDED AT PHOTOGRAPHING) | AUDIO SIGNAL (RECORDED AT PHOTOGRAPHING) | |

FIG. 18

| | | | | | | |
|---|---|---|---|---|---|---|
| ① | HEADER SIGNAL | AUDIO SIGNAL (FOR ADDITION) | HEADER SIGNAL | AUDIO SIGNAL (RECORDED AT PHOTOGRAPHING) | HEADER SIGNAL | IMAGE SIGNAL (FOR 1H) |
| ② | HEADER SIGNAL | AUDIO SIGNAL (FOR ADDITION) | HEADER SIGNAL | AUDIO SIGNAL (RECORDED AT PHOTOGRAPHING) | HEADER SIGNAL | IMAGE SIGNAL (FOR 1H) |
| ③ | ... | ... | ... | ... | ... | ... |
| ④ | HEADER SIGNAL | AUDIO SIGNAL (FOR ADDITION) | HEADER SIGNAL | AUDIO SIGNAL (RECORDED AT PHOTOGRAPHING) | HEADER SIGNAL | IMAGE SIGNAL (FOR 1H) |
| ⑤ | HEADER SIGNAL | AUDIO SIGNAL (FOR ADDITION) | HEADER SIGNAL | AUDIO SIGNAL (RECORDED AT PHOTOGRAPHING) | HEADER SIGNAL | IMAGE SIGNAL (FOR 1H) |
| ⑥ | HEADER SIGNAL | AUDIO SIGNAL (FOR ADDITION) | HEADER SIGNAL | AUDIO SIGNAL (RECORDED AT PHOTOGRAPHING) | HEADER SIGNAL | IMAGE SIGNAL (FOR 1H) |
| ⑦ | HEADER SIGNAL | AUDIO SIGNAL (FOR ADDITION) | HEADER SIGNAL | AUDIO SIGNAL (RECORDED AT PHOTOGRAPHING) | HEADER SIGNAL | IMAGE SIGNAL (FOR 1H) |
| ⑧ | HEADER SIGNAL | AUDIO SIGNAL (FOR ADDITION) | HEADER SIGNAL | AUDIO SIGNAL (RECORDED AT PHOTOGRAPHING) | HEADER SIGNAL | IMAGE SIGNAL (FOR 1H) | ns
IMAGING SYSTEM WHICH CHANGES THE FRAME RATE OF THE IMAGE SIGNAL

BACKGROUND OF THE INVENTION

1. Field of the Invention

The invention relates to an imaging system and, more particularly, to a system for recording or reproducing a photographed image signal or input audio signal as a digital signal.

2. Related Background Art

Conventionally, a digital electronic camera as shown in FIG. 1 typifies this type system.

In FIG. 1, reference numeral 800 denotes a digital electronic camera and 801 indicates a memory card which is used as its medium. In the digital electronic camera 800, reference numeral 1 denotes an image pickup lens; 2 a shutter having both of an iris function and a shutter function; 3 an electronic flash; 4 a CPU for controlling a mechanical and operation unit; and 5 a circuit for driving each unit of a mechanical system.

Reference numeral 6 denotes an image pickup element such as a CCD or the like for converting a reflected light from an object to be photographed to an electric signal; 7 a timing signal generation circuit (hereinafter, simply abbreviated as TG) for generating a timing signal that is necessary to make the image pickup element 6 operative; 8 an image pickup element driving circuit for amplifying a signal from the TG 7 to a level at which the image pickup element can be driven; 9 a preprocessing circuit having a CDS circuit to eliminate output noise of the image pickup element 6 and also having a nonlinear amplifying circuit to perform a nonlinear amplification before an A/D conversion; 10 an A/D converter; 12 a buffer memory; 13 a signal processing controlling CPU for controlling each signal processing unit; 14 an operation display unit for displaying messages for assisting an operation and a state of a camera; and 15 an operation unit to externally control the camera.

Reference numeral 802 denotes a memory controller for controlling the buffer memory 12; 803 a digital signal processing circuit for formatting an output of the image pickup element 6 to an output suitable for recording to the memory card 801; and 804 a memory card I/F (interface) to connect the digital electronic camera 800 and the memory card 801.

The operation will now be described.

First, by controlling the operation unit 15 by a photographer, the camera starts a photographing operation. In accordance with the operation by the photographer, a lens system is controlled by the mechanical and operation unit controlling CPU 4 and mechanical system driving circuit 5. In this instance, photographing conditions and the like are displayed on the operation display unit 14, thereby informing the state of the camera to the photographer. Further, a brightness of the object is measured by a photometric circuit (not shown) and an iris value and a shutter speed of the shutter 2 that is also used as an iris are calculated by the CPU 4. On the basis of a control value derived by the CPU 4, the shutter 2 is driven by the mechanical system driving circuit 5. In accordance with an output of the photometric circuit, the electronic flash 3 is turned on and the object is photographed.

The reflected light of the object which was exposed as mentioned above is inputted to the image pickup element 6 through the image pickup lens 1 and shutter 2. The shutter 2 limits an incident light amount to the image pickup element 6. In the case of using an interlace reading type CCD as an image pickup element 6, the shutter 2 is provided so that the incident light doesn't exert an adverse influence on signal charges during the transfer of the image signal. The image pickup element 6 is operated by a driving signal obtained by amplifying the output of the TG 7 by the image pickup element driving circuit 8. The operation of the TG 7 is controlled by the CPU 13.

The output of the image pickup element 6 driven as mentioned above is supplied to the preprocessing circuit 9. The preprocessing circuit 9 executes a CDS processing for eliminating low frequency noise included in the output of the image pickup element and a process for converting the image pickup signal to the nonlinear signal in order to effectively use a dynamic range of the A/D converter 10. The preprocessed image pickup signal is converted to a digital signal by the A/D converter 10 and is inputted to the memory controller 802.

Under control of the signal processing controlling CPU 13, the memory controller 802 first temporarily stores the digital image pickup signal into the buffer memory 12 and, further, reads out the image pickup signal in accordance with a predetermined order that is decided by a color filter construction or the like of the image pickup element 6. The read-out digital signal is converted to a signal of a predetermined format by the digital signal processing circuit 803 and is recorded in the memory card 801 through the memory card I/F 804.

The digital electronic camera as mentioned above, however, has the following problems.

(1) A function is limited to the image pickup recording of a still image and it is impossible to correspond the function to a moving image and to couple the image with audio data.

(2) A data compressing method for efficiently recording data to a medium is limited and it is impossible to function with another method.

(3) It is difficult to integrate an advanced information processing apparatus which can produce effective functions (functions such as optical character recognition, audio recognition, audio synthesis, translation, image recognition, image synthesis, etc.) by combining with the image pickup apparatus or an audio input/output device.

On the other hand, in order to solve the above problems, all of the processing functions must be built in the camera. The apparatus itself increases in size, as well as an extreme increase in price. Particularly, there is a problem such that those drawbacks become large disadvantages for the user who doesn't need such functions.

When such a moving image is recorded, for instance, a video camera of the NTSC system operates at a rate of 30 frames/second and it is impossible to change such a rate with control from the computer side. Therefore, even in the case where it is sufficient to use a low rate such as a few frames per second, the size of a recording file is large and a memory device of a large capacity is necessary for the computer side. In the case of a computer such that an image can be processed only at a low rate, an image signal cannot be outputted.

SUMMARY OF THE INVENTION

It is an object of the invention to solve the problems as mentioned above.

Another object of the invention is to provide a system which can change a frame rate at the time of a recording of a moving image in accordance with an application.

According to a preferred embodiment of the invention, the above objects are accomplished by an imaging system comprising: (A) an image pickup device having (a) image pickup means and (b) first means for outputting an image signal from the image pickup means; and (B) a signal processing apparatus having (a) second means for inputting the image signal from the first means, (b) changing means for changing a frame rate of the image signal from the second means, and (c) control means for controlling a changing operation of the changing means.

Still another object of the invention is to provide a system which can easily expand a function and change a performance in which the recording/reproduction of an image is set to a fundamental operation while minimizing a size and costs of an imaging system.

The above and other objects and features of the present invention will become apparent from the following detailed description and the appended claims with reference to the accompanying drawings.

BRIEF DESCRIPTION OF THE DRAWINGS

FIGS. 10A to 10C are timing charts for explaining the signal sampling operation in the embodiment;

FIGS. 11A to 11D are timing charts for explaining the transfer operation of the embodiment;

FIG. 12 is a constructional diagram for explaining a data arrangement in the recording on a recording medium in the embodiment;

FIGS. 13A to 13C are timing charts for explaining data output timing to a D/A converter in the embodiment;

FIGS. 14A to 14F are timing charts for explaining another signal sampling operation in the embodiment;

FIG. 15 is a constructional diagram for explaining another example of a data arrangement in the recording on a recording medium in the embodiment;

FIG. 16 is a constructional diagram for explaining still another example of a data arrangement in the recording on the recording medium in the embodiment;

FIG. 17 is a constructional diagram for explaining further another example of a data arrangement in the recording on the recording medium in the embodiment; and FIG. 18 is a diagram showing further another example of a data arrangement in the recording on the recording medium in the embodiment.

DETAILED DESCRIPTION OF THE PREFERRED EMBODIMENTS

The invention will now be described hereinbelow with respect to a plurality of embodiments.

An imaging system of the embodiment has an expansion interface for processing an external signal in addition to an interface for a recording medium. By inserting an expansion card for performing compressing and expanding processes in a real-time manner into the imaging system, not only a still image but also a moving image can be recorded. Further, by connecting the imaging system to a host computer through such an expansion card, a variable control of a frame rate can be realized.

Figure 2B:
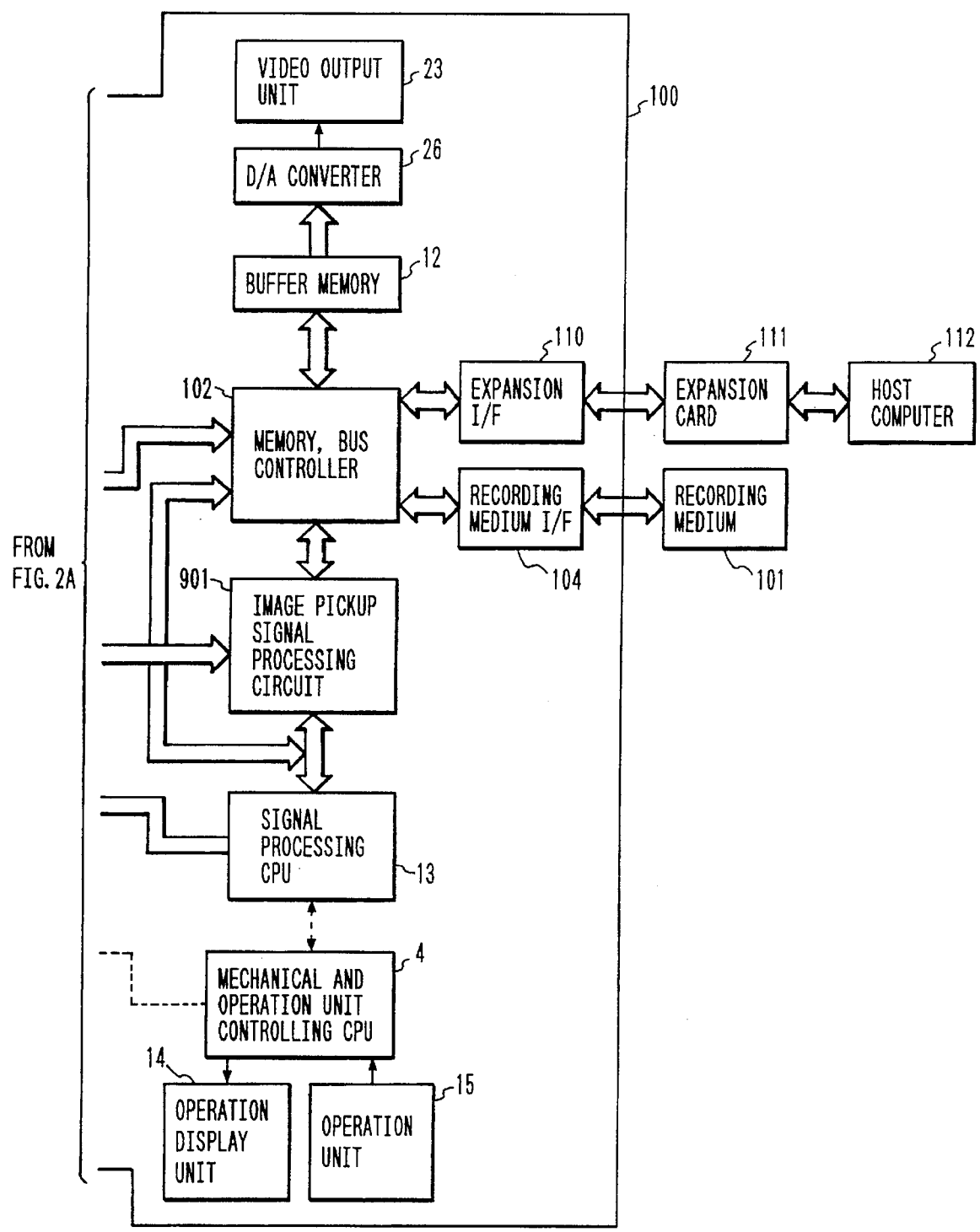
FIG. 2, comprised of FIGS. 2A and 2B, is a constructional block diagram of an embodiment of the invention.

FIGS. 2A and 2B show constructional block diagrams of an image pickup recording and reproducing system which can record a moving image according to an embodiment of the invention. Reference numeral 1 denotes the image pickup lens; 2 the shutter having both of an iris function and a shutter function; 3 the electronic flash; 4 the CPU for controlling the mechanical and operation unit; 5 the driving circuit of each unit of the mechanical system; 6 the image pickup element such as a CCD or the like for converting a reflected light from an object to an electric signal; 7 the timing signal generation circuit (hereinafter, referred to as a TG) for generating a timing signal that is necessary for making the image pickup element 6 operative; 8 the image pickup element amplifying circuit for amplifying a signal from the timing signal generation circuit 7 to a level at which the image pickup signal can be driven; 9 the preprocessing circuit having a CDS circuit for output noise of the image pickup element 6 and a nonlinear amplifying circuit for performing a nonlinear amplification before the A/D conversion; 10 the A/D converter; 12 the buffer memory; 13 the signal processing controlling CPU for controlling each unit of the signal processing system; 14 the operation display unit for displaying messages for assisting the operation and showing a state of a camera; and 15 the operation unit for controlling the camera from the outside.

Reference numeral 901 denotes an image pickup signal processing circuit for performing an image pickup signal process for unprocessed digital image data. Reference numeral 102 denotes a memory/bus controller. In accordance with an instruction from the signal processing controlling CPU 13, the memory/bus controller 102 transfers image and audio data between the memory/bus controller 102 and an expansion card 111, a recording medium 101, or the image pickup signal processing circuit 901 and also transfers the image data to the buffer memory 12 for displaying an image. Reference numeral 26 denotes a D/A converter for converting an image in the buffer memory 12 to an analog video signal; 23 a video output unit; 20 an external audio input circuit such as a microphone or the like for inputting an audio signal; 21 a switch for selectively outputting either one of an output of the audio input circuit 20 and an output of a D/A converter 25; 22 an audio output unit to output an audio signal from the switch 21 to a monitor or the outside; 11 an A/D converter for converting an input audio signal to a digital signal; and 25 the D/A converter for converting an audio signal from the CPU 13 to an analog signal.

Reference numeral 101 denotes the recording medium such as semiconductor memory card, hard disk, or the like based on the PCMCIA standard; 104 a recording medium interface; and 110 an interface of the expansion card and the card. Each interface has a connector section for connecting the recording medium 101 and expansion card 111. Reference numeral 111 denotes the expansion card having a signal processing section and has a function for compressing and expanding both image and audio signals. An image can be recorded at a rate of up to 30 frames/second. Reference numeral 112 a host computer for controlling an image pickup system for a camera (image pickup device) 100 and for transmitting and receiving image data.

Figure 3:
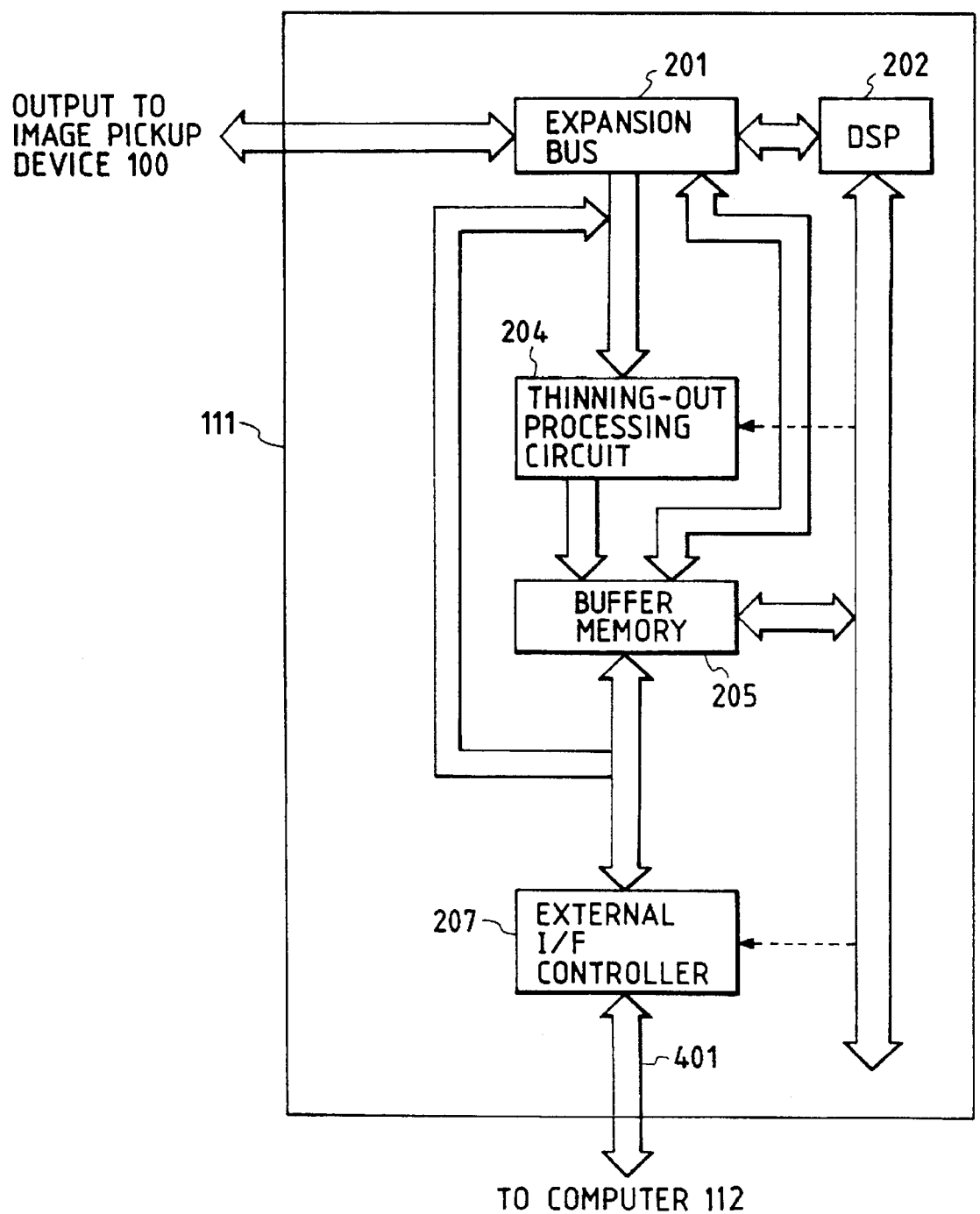
FIG. 3 is an internal constructional block diagram of an expansion card in FIGS. 2A and 2B.

FIG. 3 is a block diagram showing an internal construction of the expansion card 111. In the diagram, reference numeral 201 denotes an expansion bus I/F controller for transferring digital data on an expansion card interface; 202 a DSP (digital signal processor) for communicating with the host computer through a compressing and expanding process and an external interface; 204 a thinning-out processing circuit for thinning out the image pickup processed signal in vertical and horizontal spatial directions and by the number of images per time, namely, in a time base direction; 205 a buffer memory which intervenes in the data transfer among the expansion bus, thinning-out circuit, DSP, and external interface; 207 an external interface controller (for example, SCSI controller) for controlling a communication with an external bus; and 401 an external bus for connecting the host computer 112 and the image pickup device 100. In the embodiment, only the recording and reproduction of an image signal will be described and a detailed description regarding an audio signal will be provided in an embodiment, which will be described hereinlater.

A flow of signals in the case of recording a moving image by the imaging system of the embodiment will now be described with reference to FIGS. 2A, 2B and 3.

When the user designates a start of the recording of a moving image from the operation unit 15 or the host computer 112 such as a personal computer or the like, the mechanical and operation unit controlling CPU 4 controls the mechanical system driving circuit 5, thereby controlling a lens system.

The image signal which was photoelectrically converted by the image pickup element 6 is subjected to a CDS process to eliminate low frequency noise included in an output of the image pickup element and a process for making an image pickup output nonlinear in order to effectively use a dynamic range of the A/D converter by the preprocessing circuit 9. After that, the processed image signal is converted to the digital signal by the A/D converter 10 and is sent to the memory/bus controller 102. The memory/bus controller 102 temporarily stores the image data into the buffer memory 12 under control of the signal processing controlling CPU 13. The image pickup signal processing circuit 901 reads out the image data in accordance with a predetermined order that is determined by a construction of color filters of the image pickup element 6 or the like. The read-out digital signal is separately processed with respect to luminance information and color information and is further temporarily transferred to the expansion card 111 through the memory/bus controller 102 and expansion I/F 110 in order to further compress an information amount.

When a notification to start a compression recording is received from the CPU 13 or host computer 112, the DSP 202 receives the image data from the expansion bus I/F controller 201. The image signal is directly transferred to the buffer memory 205 or is thinned out by the thinning-out processing circuit 204 and is transferred to the buffer memory 205. After all of the luminance information and color information are transferred to the buffer memory 205, the thinning-out processing circuit 204 notifies the end of the transfer of the image data to the DSP 202.

When the notification of the end of transfer is received, the DSP 202 compresses the information amount of the image signal stored in the buffer memory 205 by using a well-known technique such as a DCT or the like and controls the expansion bus interface, memory/bus controller 102, and recording medium interface 104 and records the compressed image signal to the recording medium 101.

When the image signal is preserved in the recording medium as a moving image file, not only the image data but also information such as frame rate, image size, the number of colors, compressing and expanding method, and the like which are necessary upon reproduction is added and they are preserved as one file. As a recording file format, for instance, a file structure such as an MSDOS can be used.

The expansion card 111 has a performance to perform a compression recording at a rate of 30 frames/second in a real-time manner in accordance with a frame rate of an ordinary video system. However, there is the case such that the user wants to reduce the frame rate to a value lower than such a value and to record such as the case where even if the compression is executed, a recording capacity of the recording medium 101 is insufficient, the case where there is no need to express a smooth motion, and the case where a capability of the host computer is inadequate, or the like.

In the embodiment, it is possible to record at a frame rate suitable for the host computer 112 with control from the host computer 112. Namely, the number of picture planes per unit time in the moving image signal is changed and the image data can be recorded. A method in such a case will now be described hereinbelow.

Figure 4:
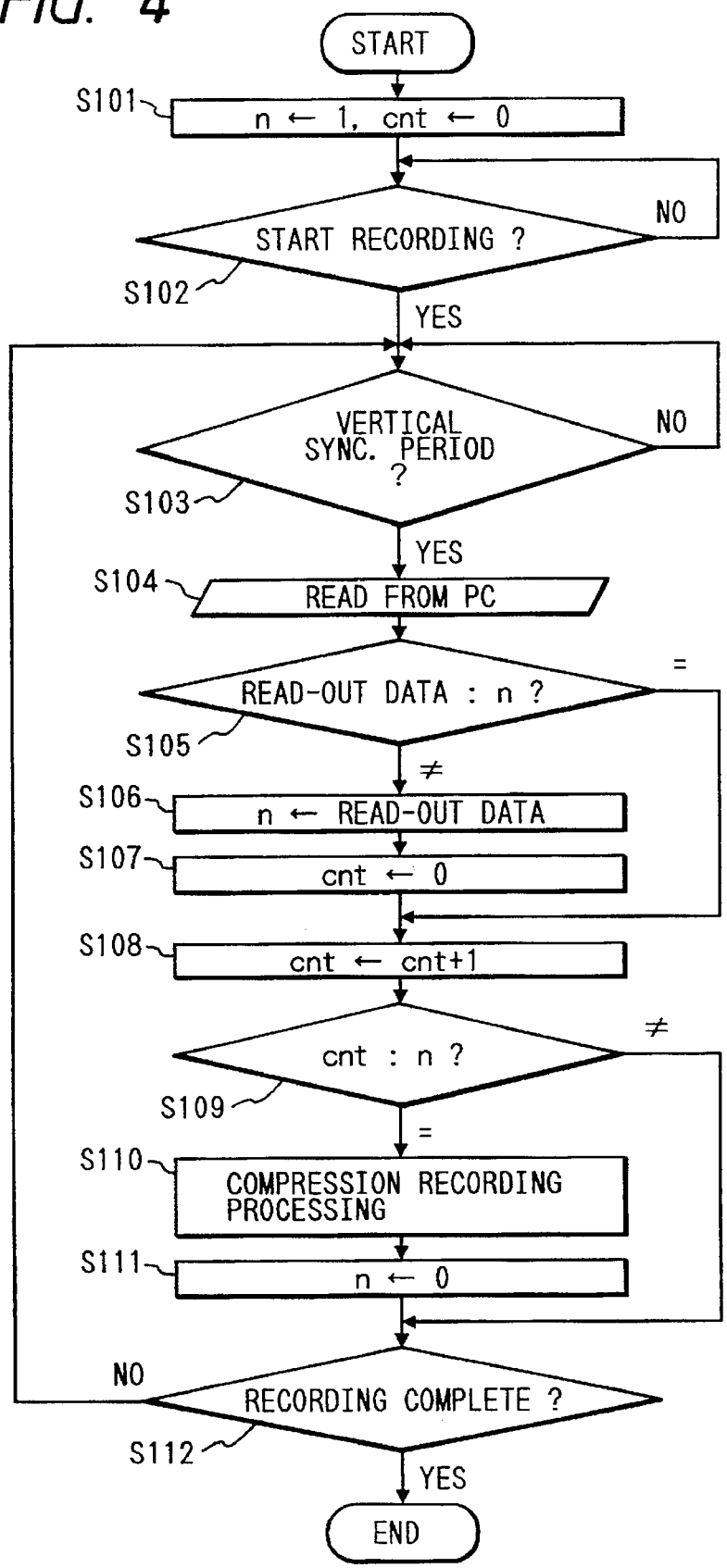
FIG. 4 is a flowchart for a recording operation sequence in FIGS. 2A and 2B.

FIG. 4 shows a sequence flowchart for the recording operation in the case of changing the frame rate. In the diagram, (n) denotes a mode (which will be explained hereinlater) of the present frame rate and (cnt) indicates a count value of a counter provided in the thinning-out processing circuit 204.

First, a rate of 30 frames/second (n=1) is set as an initial state (step S101). When a signal to start the recording is inputted from the host computer side (step S102), the moving image data from the image pickup device 100 is transferred to the expansion I/F 110 in the expansion card at every 1/60 second by the memory/bus controller 102. A vertical sync signal is supplied from the image pickup device 100 to the host computer 112 at a period of, ordinarily, 1/60 second. Synchronously with the vertical sync signal, the image data of one field is stored from the image pickup device to the buffer memory 205 through the expansion bus I/F controller 201. Each time the vertical sync signal is received (step S103), the host computer 112 transmits a data train indicative of the mode selected at present to the expansion card 111 side (step S104).

Figure 5A:
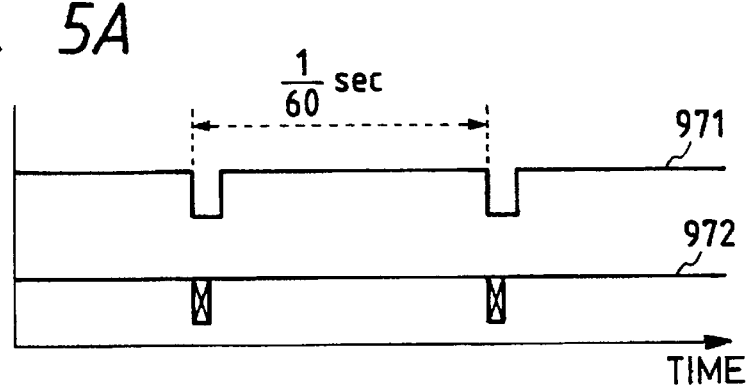
FIG. 5 is a diagram showing an example of a timing chart for explaining a transmission data train and a transmission format.
Figure 5B:
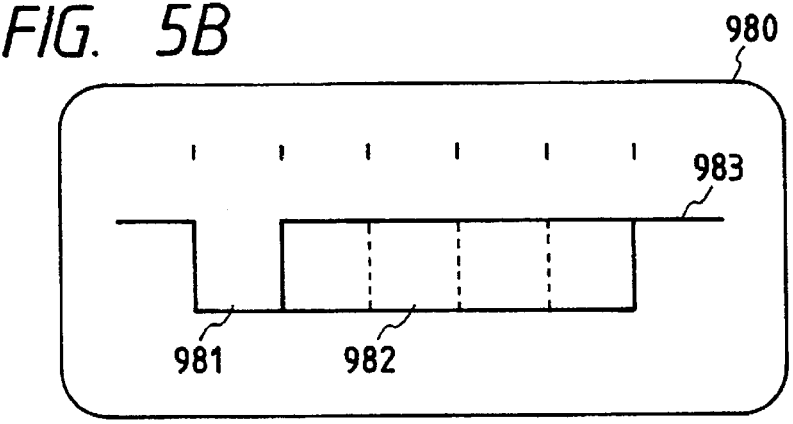

FIG. 5 shows an example of a transmission data train and a transmission format. Reference numeral 971 denotes the above-mentioned vertical sync signal; 972 a waveform of a data train which is transmitted from the host computer 112 to the expansion card 111; and 980 an enlarged waveform of the data train. In this instance, the mode of the frame rate is expressed by binary data 982 of four bits. A start bit 981 and a stop bit 983 are added to the 4-bit binary data 982. The resultant data is transmitted as 6-bit asynchronous serial data. Now, assuming that such a mode is set to (n), a frame rate F is expressed by $$F \text{ (frames/second)} = 30.0/n$$

The thinning-out processing circuit 204 in the expansion card 111 detects the transmission data train (n) which was read from the host computer side for a vertical blanking period and executes a thinning-out process (picture planes are thinned out) in the time base direction in accordance with a value detected. For example, now assuming that the video rate is changed from the ordinary video rate of 30 frames/second (n=1) to 10 frames/second (n=3), a change in such data is detected for the next vertical blanking period (step S105). The data 3 after the change is substituted into (n) (step S106). In this case, control is performed by using a counter in a manner such that the compression recording process is executed only once per three times to the image data transferred from the image pickup device side and the remaining image data is not recorded (steps S107 to S111). Those operations are repeated until a command to finish the recording is generated from the host side (step S112).

Figure 6:
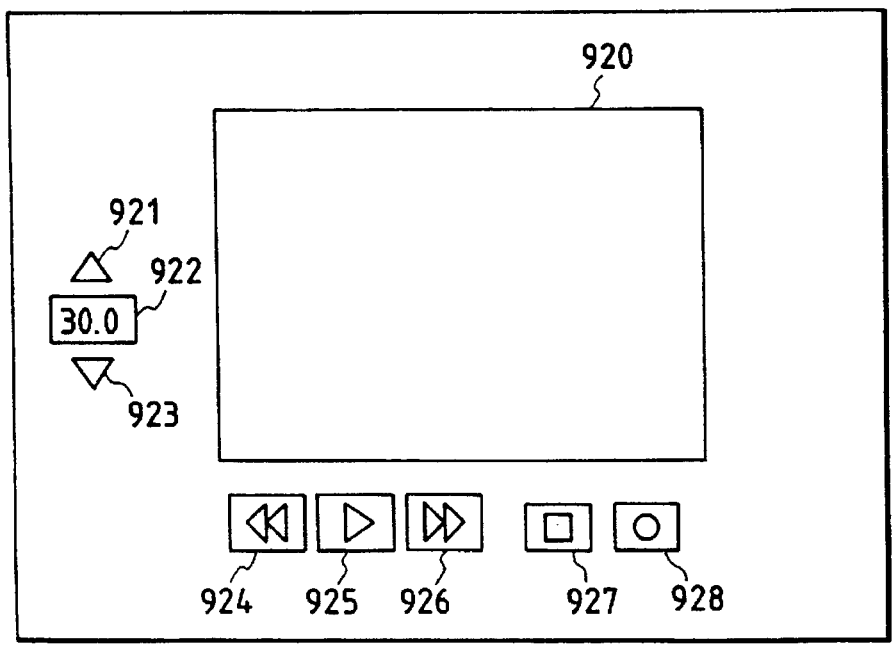
FIG. 6 is a diagram showing a display/input picture plane in a host computer in the embodiment.

FIG. 6 shows an example of a display and input picture plane in the host computer that is used to control the image pickup system from the host computer. Reference numeral 920 denotes an image display section for displaying a recording image or a reproducing image and for overlapping information such as date, time, file name, count value, and the like of the image and displaying the image. The display section 920 displays a through image from the expansion card 111 at a set frame rate. Therefore, a limit of the frame rate of an image to be displayed corresponds to the host computer. By clicking each button in the picture plane by using a pointing device such as a mouse or the like (not shown), an input operation can be performed.

Reference numerals 921 and 923 denote frame control buttons for controlling a frame rate of the recording so as to increase or decrease; 922 a frame rate display section to display the present frame rate; 924 a rewind button; 925 a play button; 926 a fast-forward button; 927 a stop button; and 928 a recording start button. The imaging system of the invention has a user interface such that the user can operate the system the same manner in that the user operates an ordinary VTR. Therefore, the user can start or stop the recording and can freely set a desired frame rate through such a display and input picture plane from the host computer 112.

However, in the case where the set frame rate exceeds the capability of the host computer 112, although an image is displayed on the display section 920 in FIG. 6 at a highest frame rate at which the image can be displayed, the set frame rate is displayed.

In the embodiment, by thinning out the images in the time base direction by using only the thinning-out processing circuit in the expansion card 111 in accordance with an input from the host side, a frame rate upon recording can be changed. Since a communication is performed between the expansion card 111 and the host computer 112 at every vertical blanking period, a system of a high reliability having advantages such that the invention can also cope with a change in frame rate even during the recording operation, moreover, even in the case where the operation of the software on the host side becomes abnormal, such an abnormality can be quickly determined and corrected.

In the embodiment, the method of varying the frame rate by the thinning-out processing circuit in the expansion card 111 has been shown. Another embodiment in which the frame rate is changed by changing a clock which is provided to the timing signal generator in the image pickup device 100 will now be described.

Figure 1:
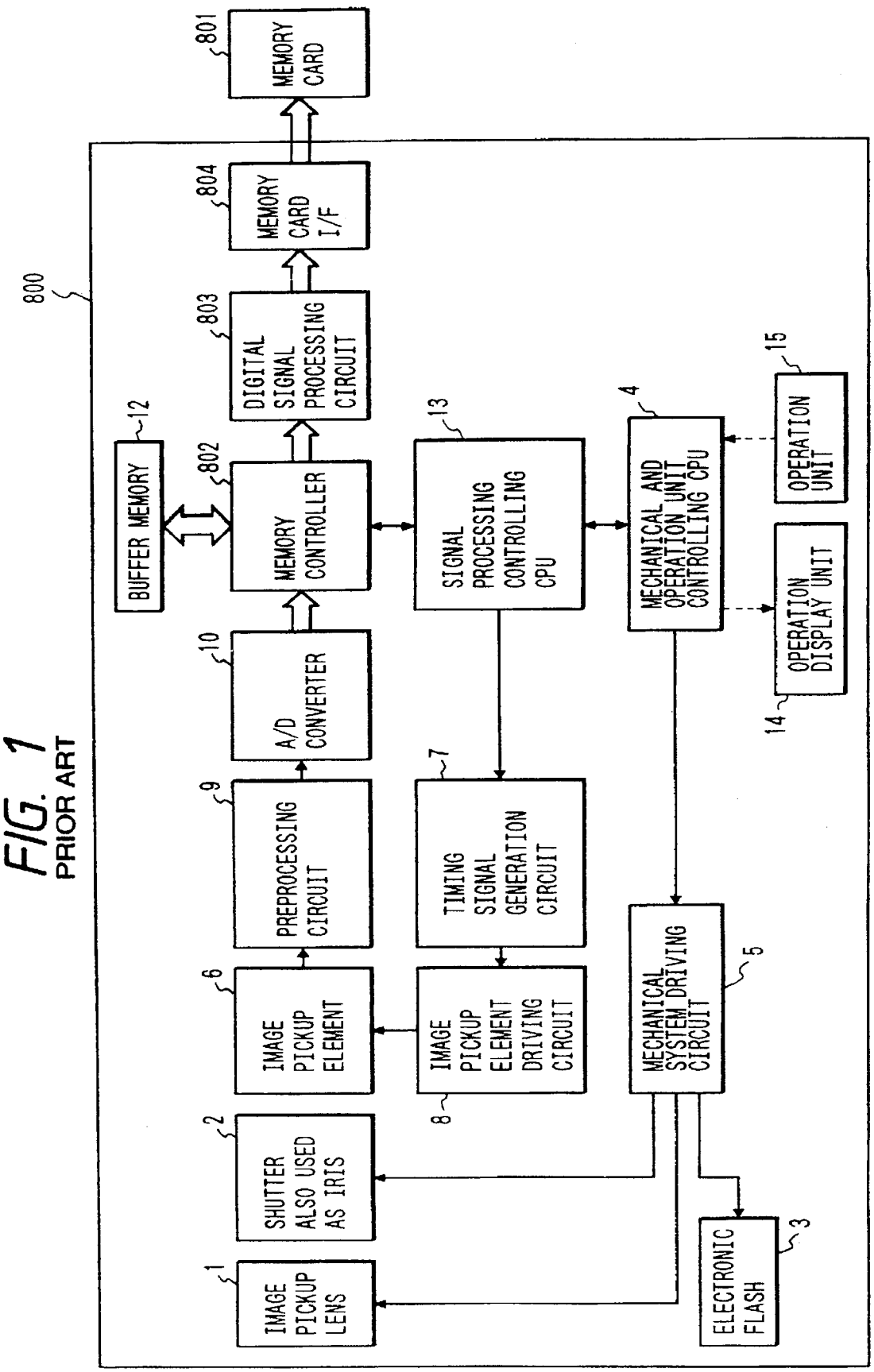
FIG. 1 is a block diagram showing a construction of a conventional digital electronic camera.
Figure 7B:
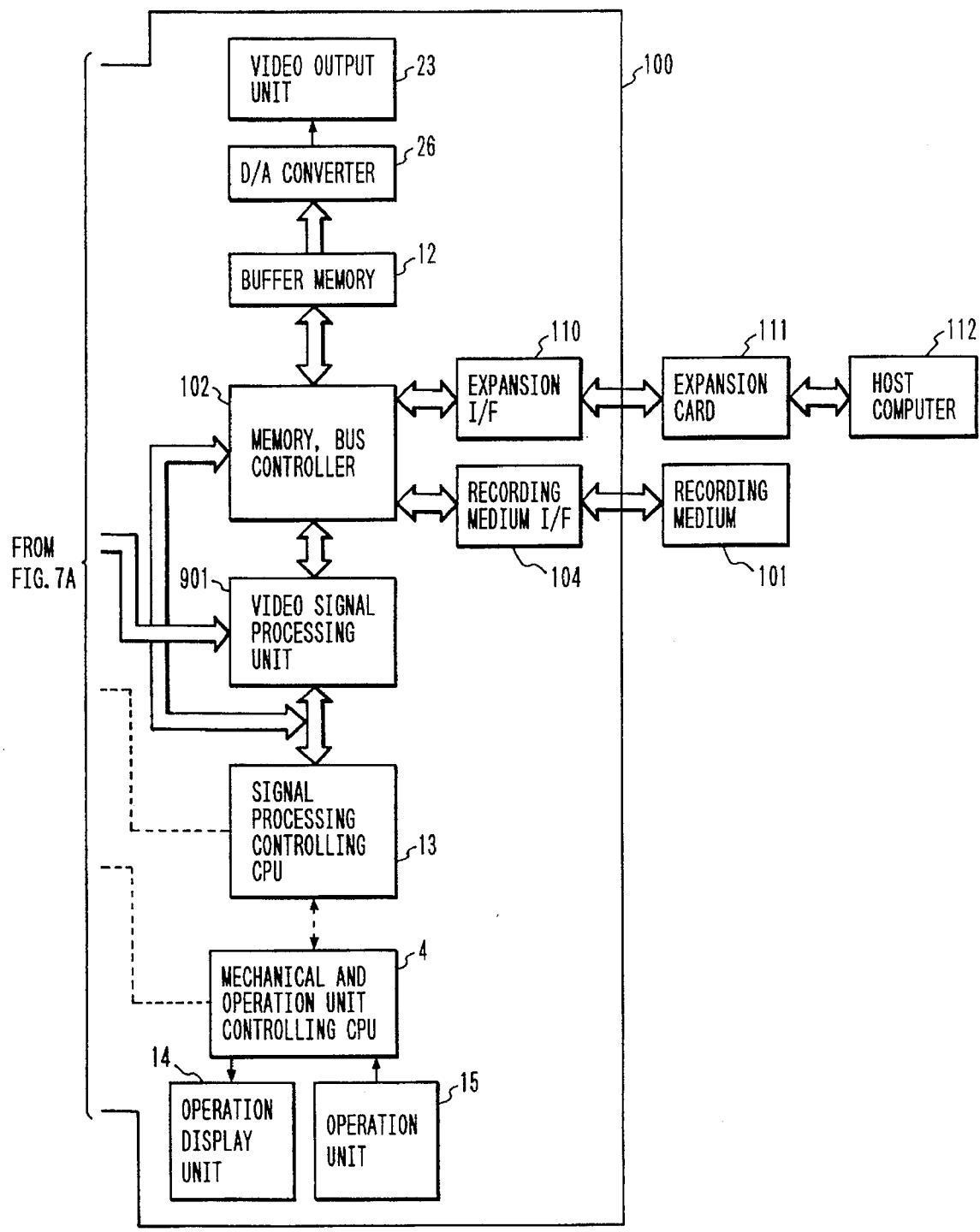
FIG. 7, comprised of FIGS. 7A and 7B, is a constructional block diagram of another embodiment.

FIGS. 7A and 7B are block diagrams showing a construction of an image pickup recording and reproducing system which can record a moving image according to the embodiment. The same or corresponding component elements as those in FIG. 1 are designated by the same reference numerals. Reference numeral 902 denotes a reference signal generator having a function to change a frequency dividing ratio of a clock that is provided to the TG 7. Since the other constructional blocks are similar to those of the first embodiment, their overlapped descriptions are omitted here. A flow of signals in the case of recording a moving image by the imaging system of the embodiment will now be described with reference to FIGS. 7A and 7B.

For example, when a change in frame rate is designated from the host computer 112 by using a display and input picture plane as shown in FIG. 5, such information is transferred as a frame rate change command to the external bus 401. In the embodiment, such information is further transmitted to the signal processing and controlling CPU 113 in the image pickup device 100 through the expansion bus I/F controller 201.

When the frame rate change command is received, the signal processing controlling CPU 13 changes a frequency dividing ratio of the reference signal generator 902 in accordance with the designated frame rate. Thus, since a sync signal which is provided to the TG 7 is changed, the image pickup element can be eventually driven at the designated frame rate. The CPU 13 changes not only the input to the TG 7 but also operation timing of the image pickup signal processing circuit 901 and memory/bus controller 102 in accordance with the designated frame rate. In this instance, since the moving image is displayed on the image display section 920 in FIG. 6 at the changed frame rate, the user can confirm a change situation on the display picture plane.

With respect to a correction of an exposure amount due to a change in exposing time of the image pickup element 6, in case of using a feedback type AE control system of the image pickup signal such that on the basis of a luminance value which is obtained from the image pickup signal processing circuit 901, the signal processing controlling CPU 13 calculates a correction amount and controls the mechanical and operation unit controlling CPU 4 and mechanical system driving circuit 5 and changes an iris value of the shutter 2 also used as an iris is used, there is no need to particularly consider such a correction of the exposure amount. In an AE control system using an external photometric element, a program diagram in which values of an iris and a shutter speed are set is changed in accordance with the frame rate, so that the system can cope with such a correction.

In the case of outputting the image data to the video output unit 23, it is necessary to perform a process such as an interpolation or the like in order to obtain a signal adapted to the video standard. However, since an image can be monitored on the host computer 112 side, when the frame rate is changed, an output of the image signal to the video output unit 23 can also be inhibited. In the embodiment as mentioned above, by changing the sync signal that is provided to the TG 7, the frame rate can be changed and there is no need to perform the thinning-out process in the expansion card.

Another embodiment will now be described.

In the embodiment, the host computer 112 directly generates the sync signal and the sync signal is inputted to the image pickup element driving circuit 8 through the TG 7. It is now assumed that a constructional block diagram of another embodiment commonly uses the diagrams of FIGS. 7A and 7B.

In the host computer 112, the vertical sync signal corresponding to the frame rate set by the user is generated and is transmitted to the signal processing controlling CPU 13 via the expansion card 111, expansion I/F 110, and memory/bus controller 102. The signal processing controlling CPU 13 detects a period of the signal and performs a drive control of the image pickup signal processing unit 901 and a control of the output timings of the recording medium I/F 104 and expansion I/F 110 in accordance with the period. The vertical sync signal is also inputted to the reference signal generator 902, by which a horizontal sync signal is generated and is inputted to the TG 7 together with the vertical sync signal. Another flow of signals is substantially the same as that in the foregoing embodiment.

In the above embodiment, the user side has set the frame rate. However, if software to examine the kind of CPU is installed in the host computer 112, a capacity of a built-in RAM, a memory capacity and an accessing speed of a hard disk, and the like is formed and held in a ROM or the like in the expansion card 111 and such a circuit is provided in the expansion card 111 and a mode such as to determine a frame rate upon recording from the result of them is prepared, the image data can also be automatically recorded at the maximum rate according to a processing ability of the host computer 112.

Since the host computer 112 side directly generates the vertical sync signal, there is an advantage such that the frame rate which can be changed by only a multiple series in the foregoing embodiment can be freely set to an arbitrary value in the embodiment.

Although not mentioned in the foregoing embodiment, the frame rate can also be set to be higher than the frame rate of 30 frames/second by the setting from the host computer 112. For example, in an apparatus using an image pickup element which needs a time of $\frac{1}{30}$ second to read out all of the pixels, such a setting can be realized by using a construction such that in the case where the frame rate is set to $\frac{1}{120}$ seconds by the host computer 112, $\frac{1}{4}$ of the number of all vertical scanning lines are read out as an effective signal and the remaining $\frac{3}{4}$ are swept out as an invalid signal for a blanking period by a high speed vertical transfer and a high speed horizontal transfer. By constructing as mentioned above, it is possible to satisfy a request such that the user wants to perform a high speed photographing even if resolution is slightly sacrificed.

In such a case, it is also necessary to control the operation timing of each circuit in the image pickup device 100, an output of the image signal to the video output unit 23, or the like.

In a manner similar to the foregoing embodiment, the frame rate of the image which is displayed in the display unit 920 shown in FIG. 6 is not higher than the frame rate of the image signal which is processed in the host computer 112.

According to the embodiment as described above, there are advantages such that since the frame rate changing means is provided in the moving image imaging system and the frame rate can be controlled, the frame rate at the time of the recording or through can be freely changed in accordance with an application. Thus, there are effects such that a size of recording file can be reduced and the image data can be recorded in accordance with a processing ability of a connected computer.

Still another embodiment of the invention will now be described.

A digital electronic camera of the embodiment has an interface for a recording medium and an expansion card interface having a signal processing, compressing, and external interface. The digital electronic camera of the embodiment performs the minimum function as a digital electronic camera when no expansion card is loaded and, when the expansion card is loaded, an image and audio signal processing ability is remarkably improved and an accessing function to the external interface is provided, so that an advanced system construction is realized.

Figure 8B:
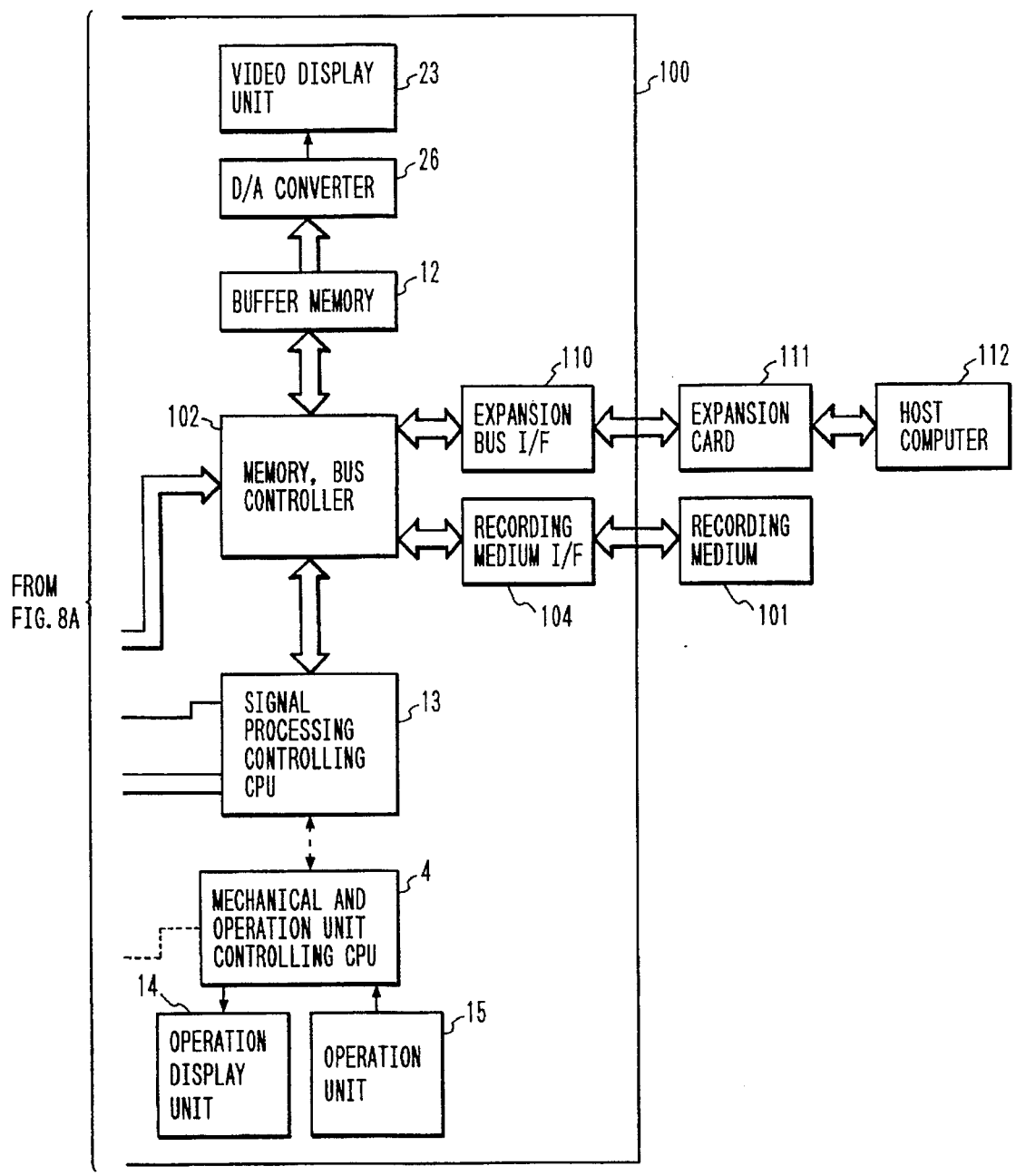
FIG. 8, comprised of FIGS. 8A and 8B, is a block diagram showing an embodiment of the invention.
Figure 9:
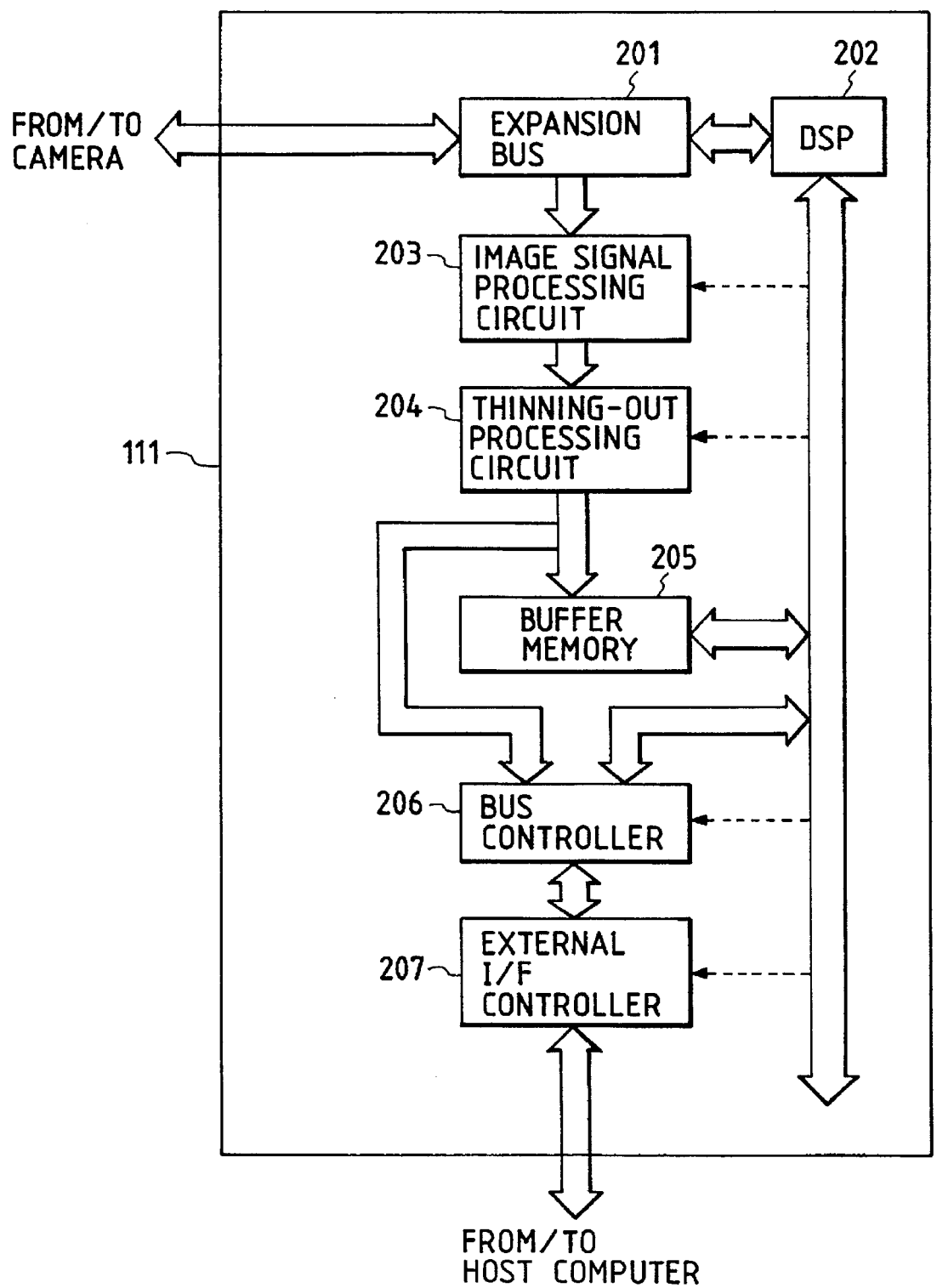
FIG. 9 is a block diagram of an expansion card which is used in the embodiment of FIGS. 8A and 8B.

FIGS. 8A and 8B are block diagrams showing the digital electronic camera according to an embodiment of the invention and FIG. 9 is a block diagram showing an expansion card.

In FIGS. 8A and 8B, the elements having the same functions as those shown in FIGS. 2A and 2B are designated by the same reference numerals.

In FIGS. 8A and 8B, reference numeral 100 denotes the digital electronic camera (hereinafter, simply referred to as a camera) according to the invention. The expansion card 111 is electrically and mechanically detachably connected to the camera 100 through connecting means constructed by a connector and the expansion bus interface 110. The recording medium 101 is electrically and mechanically detachably connected to the camera 100 through connecting means constructed by a connector and the recording medium interface 104. A control section is constructed by the signal processing controlling CPU 13, memory/bus controller 102, and the like.

In FIG. 9, reference numeral 201 denotes the expansion bus interface controller to transfer the digital data on the expansion card interface; 202 the digital signal processor for communicating with the host computer 112 through the compressing and expanding processing and external interface; 203 an image pickup signal processing circuit for performing a image pickup signal process to unprocessed image data; 204 the thinning-out processing circuit for thinning out the processed image pickup signal in the vertical and horizontal spatial directions and for thinning out such a signal by the number of images per time; 205 the buffer memory for temporarily storing the noncompression image data; 206 a bus controller for controlling a data transfer between the bus controller 206 and the thinning-out processing circuit 204, DSP 202; and 207 an external interface controller (for example, SCSI controller) to control a communication with the external interface.

The operation according to the above construction will now be described.

A description will now be provided in detail with respect to a case (1) where the expansion card 111 is not loaded and a case (2) where the expansion card 111 is loaded, respectively.

(1): When the expansion card is not loaded

The signal processing controlling CPU 13 executes the entire control of the camera and also executes a filing of image data, a display, a filing of audio data, and a reproduction. Methods of realizing such functions will now be specifically explained hereinbelow.

1-1 Monitoring of recording image in an image recording mode

When the mechanical and operation unit controlling CPU 4 detects a recording mode shift command by the operation display unit 14 by the user, the signal processing controlling CPU 13 executes the following processes and displays an image to be recorded to the video output unit 23.

The CPU 13 controls a switch 24, connects the preprocessing circuit 9 and A/D converter 10, inputs the image pickup signal to the memory/bus controller 102, and sets a mode to write output data of the memory/bus controller 102 into the buffer memory 12 for image display. The image data of the image pickup signal which is not yet processed is converted to the digital data by the A/D converter 10 and is written into the image display buffer memory 12 by the memory/bus controller 102. The digital data in the buffer memory 12 is converted to the analog video signal by the D/A converter 26 and is displayed on the video output unit 23, so that the user can confirm the image to be recorded as a moving image. The image display buffer memory 12 is a simple buffer memory for displaying a video image and the number of pixels is small and color information is not displayed.

In order to display by using the image data of the image pickup signal which is not processed, the memory/bus controller 102 extracts only the pixel data corresponding to the color (for example, green) of one kind and sets it to a luminance image or calculates a luminance image in which only a carrier component of the image pickup signal is eliminated by using a simple filter arithmetic operation.

The moving image captured by the image pickup element 6 by the above processes is displayed by the video output unit 23.

1-2 Image recording

When the mechanical and operation unit controlling CPU 4 detects a photographing and recording command from the operation display unit 14 by the user, the signal processing controlling CPU 13 controls the memory/bus controller 102 and records the image data of the image pickup signal which is not processed to the recording medium 101 through the recording medium interface 104. As a recording file format in this instance, for example, a file structure like an MSDOS can be used. When the memory/bus controller 102 stops the writing into the image display buffer memory 12 for such a transfer period of time and for a predetermined period of time after completion of the recording, the image is displayed as a still image by the video output unit 23. Therefore, the user can confirm the still image which has been recorded at present by the video output unit 23.

1-3 Monitoring and recording of audio signal upon audio recording

In the audio recording mode, the signal processing and controlling CPU 13 connects an output of the audio input circuit 20 to an input of the audio output unit 22 by the switching circuit 21 and can monitor an audio signal to be recorded.

When the mechanical and operation unit controlling CPU 4 detects an audio recording command by the operation display unit 14 of the user, the signal processing controlling CPU 13 controls the switch 24 and inputs an output signal of the audio input circuit 20 to the A/D converter 10. The memory/bus controller 102 receives the audio data converted to the digital data by the A/D converter 10 and transfers to the recording medium interface 104. In this instance, as a recording file format, a file structure such as an MSDOS can be used.

The CPU 13 finishes the audio recording at a time point when the mechanical and operation unit controlling CPU 4 detects a cancellation of the audio recording command by the operation display unit 14 by the user or when the CPU 13 regards the cancellation of the audio recording due to the elapse of a predetermined time.

1-4 Simultaneous recording of image and audio

In case of simultaneously recording image and audio signals, all of the two information has to be A/D converted and recorded on a medium without losing them. In the embodiment, one A/D converter 10 is used and image and audio signals are recorded a timing as shown in FIGS. 10A to 10C.

A low level in FIG. 10A shows a timing of a horizontal blanking period of a video signal. FIG. 10B shows a sampling timing when the video signal is A/D converted. The video signal is not outputted for the blanking period but is sampled for a period of time during which the video signal is outputted. FIG. 10A shows an A/D sampling timing of the audio signal (sampling is performed when the signal shown in FIG. 10A is at the high level). A sampling pulse is outputted for a blanking period so as not to overlap with the sampling of the video signal. In this case, when the video signal is read out at a timing according to the NTSC, a repetitive frequency of the horizontal blanking period is set to 15.75 kHz and a sampling frequency of the audio signal is also set to 15.75 kHz. It is also possible to drive the video signal at a rate independent of the frequency according to the NTSC and to sample the audio signal at such a horizontal rate.

The image and audio signals which were time-sequentially A/D converted as mentioned above are stored in the buffer memory 12 through the memory/bus controller 102. Both of the image and audio signals can be confirmed by the audio output unit 22 through the D/A converter 25 and switching circuit 21.

When the image and audio signals are recorded to the recording medium 101, the image signal is transferred to the recording medium interface 104 and is recorded on the recording medium 101 for a period of time other than the vertical and horizontal blanking periods shown in FIGS. 11A and 11B. For such a transfer period of time, as for the audio signal, the data which was A/D converted by the foregoing sampling method is stored in an internal buffer of the signal processing controlling CPU 13 or in the buffer memory 12. After completion of the image transfer period, such data is transferred to the recording medium interface 104.

At this time, as shown in FIG. 11C, now assuming that the audio signal which was simultaneously recorded upon photographing is transferred and recorded for the vertical blanking period, in a one-field period of 16.7 milliseconds of the NTSC system, both of the vertical blanking period and audio data recordable periods of about 1.4 milliseconds before and after the vertical blanking period exist. The audio signal upon photographing is recorded in recording areas before and after field image pickup information corresponding to such periods. In this instance, in order to distinguish the image signal from the audio signal, a header signal is recorded before or after the data of each of the image and audio signals. FIG. 12 shows a conceptual diagram of a distribution of the recording areas on the recording medium 101.

In case of transferring at the ordinary video rate, the image data of the image pickup signal which is not processed is transferred for a period of time (=about 15 milliseconds) excluding the vertical blanking period. To realize such a data transfer, the data is transferred at a speed of about 10 Mbytes/sec. On the other hand, when the audio signal is sampled at 22 kHz at a rate of eight bits per one sample, a data capacity of 16.7 milliseconds is equal to about 370 bytes. In case of transferring the data for remaining 1.4 milliseconds, a transfer speed of about 260 kbytes/sec is needed. Those transfer speeds are satisfactory speeds so long as a memory card based on the PCMCIA standard or the like is used as a recording medium 101.

As mentioned above, the audio data which was simultaneously recorded upon photographing for the vertical blanking period in one picture plane period is transferred for the video period of time and is time divisionally multiplexed. Thus, the camera 100 of the invention can simultaneously record the image and audio signals while simultaneously monitoring them. In this instance, since the audio data can be regarded as information regarding the image, an ID signal or the like is added so as to set the image and audio signals to one pair and such a pair is file managed.

1-5 Image reproduction

When the mechanical and operation unit controlling CPU 4 detects a reproducing mode shift command by the operation display unit 14 of the user, the signal processing controlling CPU 13 executes the following processes and the image recorded on the recording medium 101 is reproduced and displayed on the video output unit 23. The CPU 13 controls the recording medium interface 104 and memory/bus controller 102 and reads out the image data which is not reproduction signal processed from the recording medium 101. The CPU 13 executes processes similar to those in the foregoing item "1-1 Monitoring of the recording image in an image recording mode" and forms luminance information and writes the information in the buffer memory 12. In this instance, when a plurality of audio data recorded in association with the image exist, the audio data can be reproduced by the following "1-6 Audio reproduction".

1-6 Audio reproduction

When the mechanical and operation unit controlling CPU 4 detects an audio reproducing command by the operation display unit 14 of the user, the signal processing controlling CPU 13 executes the following processes and reproduces the recorded audio signal by the audio output unit 22. The CPU 13 controls the switching circuit 21 and connects an output from the D/A converter 25 to an input of the audio output unit 22. The CPU 13 controls the recording medium interface 104 and memory/bus controller 102 and reads out the audio data and outputs the audio data to the D/A converter 25 at the sampling period upon recording, so that an audio signal is generated from the audio output unit 22.

1-7 Audio addition about reproduction image

By reproducing the image by "1-5 Image reproduction" and by recording the audio signal by "1-3 Monitoring and recording of audio signal upon audio recording", a description for the image can be added by after recording a voice signal while the user observes the recorded image by the video output unit 23. In this instance, the audio data is managed as audio data regarding the reproduced image. For this purpose, an ID signal is added to the image signal and audio signal. A plurality of audio data can be added to the image.

In the embodiment, when the audio data is added, as shown in FIG. 11D, the audio signal is transferred and recorded within the horizontal blanking period of the video signal and the additional audio signal is recorded on the recording areas before and after the horizontal sync signal of the video signal, so that the additional audio signal can be recorded on the other areas separately from the audio signal which was simultaneously recorded upon photographing. Therefore, the additional audio signal can be recorded without erasing the audio signal which was simultaneously recorded upon photographing. Both of the signals in the two modes can be recorded. Further, upon reproduction, both of those audio signals can be simultaneously reproduced or only either one of them can be selectively reproduced. At this time, in order to distinguish the image signal from the audio signal, a header signal can also be recorded in front of the data of each of the image and audio signals. FIG. 12 shows a conceptual diagram of a memory recording area distribution.

Now, assuming that the stereophonic audio signals are sampled at a frequency of 44.1 kHz at eight bits, the audio data of total six or four bytes can be transferred and recorded in one horizontal blanking period.

As for the audio signal recorded in each area as mentioned above, a part of the entire audio signals can be reproduced or all of the audio signals can be also simultaneously reproduced. For example, if the user wants to reproduce only the added audio signals after completion of the photographing, only the audio signals at the top stages (1) to (7) shown in the recording areas in FIG. 12 are reproduced.

In case of simultaneously reproducing the audio signals added after completion of the photographing and the audio signal upon photographing, the audio signals in (1) to (7) and (8) in FIG. 12 are respectively read out and added and are reproduced by the audio output unit 22 through the D/A converter 25. Or, as shown in FIGS. 13A to 13C, by shifting the output timing to the D/A converter 25 for each audio signal, the audio signals can be also synthesized. In this instance, by setting a clock frequency of the D/A converter 25 to a value that is twice as high as the ordinary clock frequency, the audio signals can be reproduced without deteriorating a sound quality. Further, so long as the audio output unit 22 can reproduce stereophonic audio signals, each audio signal can be also allocated to each channel.

(2): When the expansion card 111 is loaded

The expansion card 111 has a function of an image pickup signal process and a function for compressing and expanding an information amount with respect to the image and, further, a function for compressing and expanding an information amount with respect to the audio signal. The expansion card 111 also has a function for accessing to the recording medium interface 104 and for accessing to the external interface of the camera 100.

Therefore, there are realized functions such as image pickup signal process and compressing process of the signal derived from the image pickup element 6, conversion of a data format on the recording medium 101, and transfer associated with the conversion of the data format of the data on the recording medium 101 to the external interface. A function for receiving the data from the external interface, converting the data format, and recording to the recording medium 101 or returning to the external interface or the like is also realized.

"Monitoring of recording image in an image recording mode" is also executed in a manner similar to the case where the expansion card 111 is not loaded.

The other functions will now be described.

2-1 Image recording

When the mechanical and operation unit controlling CPU 4 detects a photographing recording command by the operation display unit 14 of the user, the signal processing controlling CPU 13 notifies the start of the recording of the image to the DSP 202 of the expansion card 111 and controls the memory/bus controller 102 and transfers the image data of the image pickup signal which is not processed to the expansion bus interface controllers 201 and 110 (hereinafter, simply referred to as expansion bus interfaces) through the recording medium interface 104.

When the notification of the start of the recording is received, the DSP 202 initializes the image pickup signal processing circuit 203 and thinning-out processing circuit 204 so as to receive the unprocessed image data from the expansion bus interface.

The image data is separately processed with respect to the luminance information and color information by the image pickup signal processing circuit 203 and is directly transferred to the buffer memory 205 or is thinned out by the thinning-out processing circuit 204 and is transferred to the buffer memory 205 in accordance with the recording mode. After all of the luminance information and color information are transferred to the buffer memory 205, the thinning-out processing circuit 204 notifies that the transfer of the image data is finished to the DSP 202.

When the notification of the end of the transfer is received, the DSP 202 compresses the data in the buffer memory 205 and controls the expansion bus interface controllers 201 and 110, memory/bus controller 102, and recording medium interface 104 and records the data on the recording medium 101.

To confirm the contents of the image which was more rapidly recorded after completion of the photographing, the DSP 202 can add the thinned-out image of the compressed image to the compression file. For example, even if the image obtained by thinning out the original image to about ⅛ in both of the vertical and horizontal directions is added, the file capacity is not significantly increased. Such a thinned-out image is referred to as an index image.

2-2 Monitoring and recording of audio signal upon audio recording

The monitoring of the audio signal is substantially the same as the monitoring mentioned in the above item 1-3. When the mechanical and operation unit controlling CPU 4 detects an audio recording command by the operation display unit 14 of the user, the signal processing controlling CPU 13 notifies the start of the recording of the audio signal to the DSP 202. The CPU 13 receives the digital data converted by the A/D converter 10 and transfers to the expansion bus interface through the memory/bus controller 102.

The DSP 202 receives the above digital data from the expansion bus interface and compresses the information amount. After that, the DSP 202 records the compressed data to the recording medium 101 through the expansion bus interface, memory bus controller 102, and recording medium interface 104. The above operations are executed for one sampling period of time of the audio data.

When the CPU 4 detects a cancellation of the audio recording command by the operation display unit 14 of the user and the CPU 13 notifies the end of recording of the audio signal to the DSP 202 or at a time point when the DSP 202 regards that the audio recording was cancelled after the elapse of a predetermined time, the DSP 202 finishes the audio recording and notifies the end of the audio recording to the CPU 13.

2-3 Simultaneous recording of image and audio signals

When the CPU 4 detects a photographing recording command by the operation display unit 14 of the user, the CPU 13 notifies the start of the image recording to the DSP 202. In this instance, a fact that the image recording is accompanied with the audio recording is also notified. The conversion of the unprocessed image data to the non-compression image data and the transfer to the buffer memory 205 are executed in a manner similar to the foregoing item 2-1. However, the DSP 202 doesn't start the image compression and recording operation until it receives a notification of the end of the audio recording from the CPU 13.

The CPU 13 controls the memory/bus controller 102 so that the image data is transferred to the expansion bus interface instead of transferring to the recording medium interface 104 in "1-4 Simultaneous recording of image and audio". In this instance, the CPU 13 time-divisionally multiplexes the audio signal synchronously with the image transfer of the memory/bus controller 102 in a manner similar to the above item 1-4 and executes buffering and filing processes. When the filing of the non-compression audio data is finished, the CPU 13 notifies the end of the audio recording to the DSP 202.

That is, in this structure, the image data is transferred to the expansion card through the expansion bus interface, and the audio data is transferred to the recording medium through the recording medium interface.

When the notification of the end of the audio recording is received from the CPU 13, the DSP 202 executes image compressing and recording operations in a manner similar to the above item 2-1. Further, the CPU 13 reads out the non-compression audio data by controlling the recording medium interface 104, memory/bus controller 102, and expansion bus interface and transfers to the buffer memory 205 by only an amount corresponding to the memory capacity and compresses. After that, the compressed audio data is recorded on the recording medium 101 through the expansion bus interface, memory/bus controller 102, and recording medium interface 104. The above operations are repeated until all of the non-compression audio data are compressed. After completion of the data compression, the CPU 13 deletes the recorded non-compression audio data file from the recording medium 101.

2-4 Transfer of moving image data and audio data to external interface

The host computer 112 generates a command to the camera 100 so as to transfer the moving image data and audio data to the host computer 112 through the external interface.

The DSP 202 sets a mode to the memory/bus controller 102 in a manner such that the output data of the A/D converter 10 is always written into the image display buffer memory 12 and the user can monitor the image by the video output unit 23. The DSP 202 also sets a mode so as to output the output data of the A/D converter 10 to the expansion bus interface.

2-4-1 Transfer of image data

The DSP 202 controls the image pickup signal processing circuit 203 and thinning-out processing circuit 204 so as to receive unprocessed image data from the expansion bus interface. The DSP 202 also controls the bus controller 206 so as to transfer the image data from the thinning-out processing circuit 204 to the external interface controller 207. The DSP 202 sets a mode to the external interface controller 207 so as to receive the data from the bus controller 206 and to transfer to the external bus. The unprocessed image data is separately processed as luminance information and color information by the image pickup signal processing circuit 203. The processed data is thinned out as necessary by the thinning-out processing circuit 204 and is transferred to the external interface controller 207. After all of the luminance information and color information with respect to one image are transferred to the external interface controller 207, the thinning-out processing circuit 204 notifies the end of the transfer to the DSP 202. The DSP 202 notifies the end of the transfer of the image data to the CPU 13.

For a period of time during which the image is transferred to the external interface controller 207, the audio data received from the A/D converter 10 is preserved in the non-image region of the buffer memory 12 in the internal buffer of the CPU 13. Such a period is set to about 15 milliseconds as mentioned above in the item 1-4 and a buffer capacity for buffering is set to about 370 bytes.

2-4-2 Transfer of audio data

When the transfer end notification of the image data is received, the CPU 13 transfers the audio data preserved in the internal buffer or the like in the image transfer period of time to the DSP 202 through the memory/bus controller 102 and expansion bus interface. Even for such a data transfer period of time, the CPU 13 also preserves the data received from the A/D converter 10 into the internal buffer. At a time point when the image transfer end notification is received, the DSP 202 switches the bus controller 206 and transfers the audio data received from the CPU 13 to the external interface controller 207.

When the above data transfer is finished, the processes in the above item 2-4-1 are executed with respect to the next video field signal. By alternately repeating the processes of the above items 2-4-1 and 2-4-2, the image data and audio data are time-divisionally multiplexed and transferred to the external interface. Such operations are continued until some end command is generated from the external interface. For example, in case of using the SCSI, by generating attention conditions from the host computer 112, an end command is set.

Although the example in which both of the image and audio signals are simultaneously transferred has been described in the above embodiment, the operation in case of transferring only either one of the image and audio signals will be obviously understood from the above description.

2-5 Camera reproduction of image data on the recording medium

When the mechanical and operation unit controlling CPU 4 detects a reproducing mode shift command by the operation display unit 14 of the user, the signal processing controlling CPU 13 notifies an image reproducing command to the DSP 202.

2-5-1 Reproduction of unprocessed image on the recording medium

When the image file recorded on the recording medium 101 is unprocessed image data, the DSP 202 controls the recording medium interface 104, memory/bus controller 102, and expansion bus interface and reads out the image data from the recording medium 101 and inputs to the image pickup signal processing circuit 203.

The image data is processed by the processing circuit 203 in a manner similar to that mentioned above. The processed image data is thinned out as necessary by the thinning-out processing circuit 204 in accordance with the image size of the image display buffer memory 12 and is transferred to the buffer memory 205. After all of the luminance information and color information are transferred to the buffer memory 205, the thinning-out processing circuit 204 notifies the end of the transfer of the image data to the DSP 202. When such a data transfer end notification is received, the DSP 202 controls the expansion bus interface and memory/bus controller 102 and transfers the luminance information data in the buffer memory 205 to the image display buffer memory 12.

2-5-2 Reproduction of compressed image on recording medium

When the image file recorded on the recording medium 101 is compressed image data, the DSP 202 controls the recording medium interface 104, memory/bus controller 102, and expansion bus interface and reads out the compressed image data from the recording medium 101 and expands the information amount of the luminance information data. The expanded data is thinned out as necessary in accordance with the image size of the image display buffer memory 12 and is transferred to the buffer memory 12 by the expansion bus interface and memory/bus controller 102.

As mentioned above, in the case where the index image has been added, there is no need to expand the data. The data is directly transferred or is subjected to the thinning-out or interpolation and is transferred to the image display buffer memory 12 through the expansion bus interface and memory/bus controller 102 in accordance with the image size of the image display buffer memory 12.

2-6 Camera reproduction of audio data on the recording medium

When the mechanical and operation unit controlling CPU 4 detects an audio reproducing command by the operation display unit 14 of the user, the signal processing controlling CPU 13 notifies the audio reproducing command to the DSP 202. The CPU 13 controls the switching circuit 21 and selects the output from the D/A converter 25.

The DSP 202 controls the recording medium interface 104, memory/bus controller 102, and expansion bus interface and reads out the audio data. When the audio file is the non-compression audio data, the data is directly transferred to the CPU 13. When the audio file is the compressed audio data, the information amount is expanded and transferred to the CPU 13. The CPU 13 outputs the received audio data to the D/A converter 25 at the sampling period upon recording.

2-7 Transfer of image data on the recording medium to external interface

The host computer 112 generates a command to the camera 100 so as to transfer the image data on the recording medium 101 to the host computer 112 through the external interface. The unprocessed image file and compressed image file exist on the recording medium 101. On the other hand, an unprocessed image, a compressed image, and a non-compression image are used as a format of an image to be transferred to the host computer 112.

In the case of directly transferring the unprocessed image and compressed image from the recording medium 101, the DSP 202 controls the recording medium interface 104, memory/bus controller 102, and expansion bus interface and reads out the image data from the recording medium 101 and transfers the data to the bus controller 206 and external interface controller 207.

In case of converting the unprocessed image to the non-compression image and transferring, the DSP 202 converts the unprocessed image data to the non-compression image by the image pickup signal processing circuit 203 and transfers the data to the bus controller 206 and external interface controller 207 in a manner similar to the above item 2-4-1.

In case of converting the unprocessed image to the compressed image and transferring, the DSP 202 converts the unprocessed image data to the non-compression image by the image pickup signal processing circuit 203 and transfers the data to the buffer memory 205 in a manner similar to the foregoing item 2-4-1. After that, the information amount is compressed by the DSP 202 and the compressed image data is transferred to the bus controller 206 and external interface controller 207.

In case of converting the compressed image to the non-compression image and transferring the data, the DSP 202 expands the compressed image data and transfers the data to the external interface controller 207 in a manner similar to the above item 2-4-2.

2-8 Transfer of audio data on recording the medium to external interface

The host computer 112 generates a command to the camera 100 so as to transfer the audio data on the recording medium 101 to the host computer 112 through the external interface.

The audio file of the non-compression audio signal or compressed audio signal exists on the recording medium 101. On the other hand, the non-compression audio and compressed audio signals are used as an audio format of the audio signal that is transferred to the host computer 112.

In the case of directly transferring the non-compression audio data and compressed audio data from the recording medium 101, the DSP 202 controls the recording medium interface 104, memory/bus controller 102, and expansion bus interface and reads out the audio data from the recording medium 101 and transfers the data to the bus controller 206 and external interface controller 207.

The DSP 202 controls the recording medium interface 104, memory/bus controller 102, and expansion bus interface and reads out the audio data. When the non-compression audio data is converted to the compressed audio data, the DSP 202 compresses the information amount and outputs the compressed audio data to the bus controller 206 and external interface controller 207. When the compressed audio data is converted to the non-compression audio data, the DSP 202 expands the information amount and outputs the expanded audio data to the bus controller 206 and external interface controller 207.

2-9 Transfer of the image data of host computer to the recording medium

The host computer 112 generates a command from the external interface to the camera 100. The image data is transferred from the host computer 112 to the camera 100 and recorded to is recorded on the recording medium 101. As a format of the image data to be transferred from the host computer 112, there are an unprocessed image, a compressed image, and a non-compression image. A compressed image is used as an image data format on the recording medium 101.

In the case where the data format is not converted, the DSP 202 receives the image data from the external interface controller 207 and controls the expansion bus interface, memory/bus controller 102, and recording medium interface 104 and records the image data on the recording medium 101.

In case of converting the data format, the DSP 202 receives the unprocessed image data from the external interface controller 207 and transfers the data to the image pickup signal processing circuit 203. After the non-compression data is formed in the buffer memory 205, the information amount of the image data is compressed and the compressed image data is recorded on the recording medium 101. Or, the non-compression data is received and compressed and recorded on the recording medium 101.

2-10 Conversion of the format of the host computer

The host computer 112 generates a command from the external interface to the camera 100. The image and audio data are transferred from the host computer 112 to the camera 100 and the data format is converted. After that, the converted data is returned to the external interface.

As a format of the image data which is transferred from the host computer 112, there are an unprocessed image, a compressed image, and a non-compression image. As a format of the image that is returned, a compressed image and a non-compression image are used. As a format of the audio data that is transferred and returned from the host computer 112, compressed audio data and non-compression audio data are used.

In case of converting the format of the unprocessed image, the DSP 202 receives the unprocessed image data from the external interface controller 207 and bus controller 206 and transfers the data to the image pickup signal processing circuit 203. After the non-compression data is formed in the buffer memory 205, the non-compression data in the buffer memory 205 is directly returned or is compressed and is returned to the host computer 112 by controlling the bus controller 206 and external interface controller 207.

In the case of converting the format of the compressed image, the DSP 202 receives the compressed image data from the external interface controller 207 and bus controller 206 and transfers the data to the buffer memory 205. After the data is transferred, the data in the buffer memory 205 is expanded and returned to the host computer 112 through the bus controller 206 and external interface controller 207.

In the case of converting the format of the non-compression image, the DSP 202 receives the non-compression image data from the external interface controller 207 and bus controller 206 and transfers the data to the buffer memory 205. After the data is transferred, the data in the buffer memory 205 is compressed and returned to the host computer 112 by controlling the bus controller 206 and external interface controller 207.

In case of converting the format of the audio signal, the DSP 202 receives the audio data from the external interface controller 207 and bus controller 206 and transfers the data to the buffer memory 205. Until the transfer of all of the audio data is finished or after the transfer of the audio data of the amount corresponding to the capacity of the buffer memory 205 is finished, the DSP 202 converts the format of the data in the buffer memory 205 and controls the bus controller 206 and external interface controller 207 and returns the converted data to the host computer 112. The above processes are repeated until all of the audio data from the host computer 112 are processed.

Owing to the above functions, by using the expansion card 111 in the host computer 112 having a low signal processing ability, the signal processes can be executed at a high speed.

Although the sampling rate of the audio signal when the image and audio signals are simultaneously recorded in the above embodiment has been set to 15.75 kHz, in this case, a band of the audio signal which can be recorded is equal to about 7.5 kHz. Although the audio signal can be recorded and reproduced to a certain degree of sound quality even in case of such a sampling rate, the sampling rate needs to be further increased in order to record the audio signal at a higher quality. The embodiment relates to an example of methods of improving the sampling rate.

FIG. 14B is a timing chart of a horizontal transfer channel of the image pickup element 6. As compared with the timing pulse in FIG. 10B, FIG. 14B shows a state in which one pulse is omitted (1). Thus, the last pulse in the horizontal period is delayed and outputted by a time of one pulse as compared with FIG. 10B (2). A blank portion (1) and a delay portion (2) are also similarly set with respect to the A/D sampling of the video signal in FIG. 14C. As shown in FIG. 14D, the A/D sampling of the audio signal is also set so as to be executed in the pulse blank portions (1) in Figs. 14B and 14C for periods of time other than the horizontal blanking period as shown in FIG. 14A.

As mentioned above, since the sampling timing of the audio signal and the sampling timing of the image signal are not overlapped, both of the audio and image signals can be converted to the digital signals by one A/D converter for the same period of time and the sampling frequency of the audio signal can be set to a value (31.5 kHz) that is twice as high as that in the case of FIG. 10C.

Further, by setting the blank portions to two or more portions as shown in FIG. 14E, the sampling frequency of the audio signal can be further increased. By setting three blank portions as shown in FIG. 14E, the sampling frequency of the audio signal can be set to 63 kHz as shown in FIG. 14F.

In the above description, although the blank portion and delay portion of each pulse have been set to the portions corresponding to one horizontal transfer pulse, they can be also set to two or more pulses. In such a case, in the sampling of the audio signal, a sampling period can be set to a longer time. It is effective in case of needing a longer processing time in the sampling period of time of the audio signal.

In the case where a long blank portion of the pulse cannot be set in the video signal output, it is also possible to construct in a manner such that the audio data in the video period of time is accumulated in the buffer memory and the data of an amount of one horizontal period is processed in the horizontal blanking period. In FIG. 14E, the audio data of four sampling operations is processed together in the horizontal blanking period.

In the foregoing embodiment, the memory recording areas have been distributed as shown in FIG. 12. However, in such a case, since the transfer order of the signals corresponds to the arrangement of the memories, for instance, the present system can be also constructed even by using a memory such as an FIFO as a medium.

On the other hand, by using the memory corresponding to the random access, the data can also be recorded in memory areas as shown in FIG. 15. Namely, areas in which the image signals are recorded by inserting a header signal every one horizontal period are assured. After the image signals of an amount of one vertical period are assured, an audio signal area of the additional signals and an audio signal area of an amount corresponding to the signal recorded at photographing are set.

As shown in FIG. 16, an ID signal is recorded before the image signal or each audio signal and information of the corresponding image and audio signals and information indicative of the grouping, date, location, whether the image is a color image or a monochrome image, whether the audio signals are stereophonic audio sound or monaural audio sound, and the like can also be recorded.

As shown in FIG. 17, by setting a plurality of recording areas of the audio signals of an amount corresponding to the reproduction addition through a header and an ID signal, the audio addition can be performed a plurality of number of times. Upon reproduction, the audio signals can be synthesized or only a desired audio signal can be selectively reproduced.

For the embodiment in which the sampling is executed in FIGS. 10A to 10C, by recording each of the audio signals and the image signal on the basis of the arrangement corresponding to the timing of the sampling times as shown in FIG. 18, the image and audio data of the corresponding times can be also time-sequentially read out upon reproduction. The audio reproduction can be easily performed synchronously with the moving image reproduction.

According to the embodiments described above, the following remarkable effects are obtained.

First, in the case where nothing is connected to the expansion bus interface, an inexpensive recording and reproducing system can be provided. By changing the functions of the expansion card 111 as a circuit unit that is inserted to the expansion bus interface while keeping the camera 100 portion such as optical and image pickup portions or the like in which a significant amount of money and labor are required for development as a common portion, optimum systems can be provided to various users. Thus, an inexpensive system can be provided.

Further, by setting the A/D converters 10 for image and audio signals to a common A/D converter, the number of A/D converters which are used is reduced, the cost is decreased, and the size of apparatus can be miniaturized.

In the above audio recording, by changing the recording areas in the recording medium 101 with respect to the simultaneous recording audio signal which is recorded at the time of photographing and the after-recording audio signal which is inputted in accordance with the reproduction image after completion of the photographing, the simultaneous reproduction of both of the audio signals, the audio reproduction of the selected audio signal, or the like can be arbitrarily executed.

According to the embodiments described above, the expansion card and recording medium can be detachably loaded into the camera unit. The photographed video signal is converted to the digital signal and sent to the expansion card and recording medium and can be processed or can be recorded and reproduced. Therefore, various image processes can be executed in accordance with the functions of the expansion card. The recording and reproduction of the video signal from the camera unit or the recording and reproduction of the image processed signal can be executed. Further, the image processed signal can also be used by another equipment such as a host computer or the like. A system having many functions although it is small and inexpensive can be realized.

According to the embodiments, the expansion card and recording medium can be detachably loaded into the camera unit. The video signal and audio signal are converted to digital signals at different timings by one common A/D converter. The digital signals are sent to the expansion card and recording medium and can be processed, recorded, and reproduced. Therefore, there is no need to use two A/D converters for the video signal and the audio signal. The circuit construction can be simplified, and the size of the camera unit main body is not increased. Various image processes and audio processes can be executed in accordance with the functions of the expansion card. In addition to the recording and reproduction of the video and audio signals from the camera unit, the image and audio signals processed by the expansion card can also be recorded and reproduced. Further, the above processed image and audio signals can also be used in another equipment such as a host computer or the like. There is an effect such that a system having many functions can be realized although it is small and inexpensive.

Further, the audio signal which was simultaneously recorded with the video image on the recording medium and the audio signal that is after-recorded are recorded on different areas of the recording medium. Upon reproduction, both of the above audio signals are simultaneously reproduced or are reproduced from at least a part of the entire areas. Therefore, there is an advantage such that upon reproduction, the image signal and the audio signal recorded at photographing and the audio signal that is after-recorded can be individually used or can be used in combination thereof.

Although a converting operation of a frame rate, particularly, is not mentioned in the embodiment described by using FIG. 9, even the systems shown in FIGS. 8A, 8B and 9 have the converting function of the frame rate similar to those in the systems shown in FIGS. 2A, 2B and 3. Similar effects are obtained.

In this case, it is also necessary to control the transmission timing of the image and audio signals to be recorded on the recording medium, the arrangement of the image and audio data on the recording medium, and the like. However, such a control can be easily realized according to the foregoing embodiments described with reference to FIGS. 11A to 18.

What is claimed is:

1. An imaging system comprising:
   (A) an image pickup apparatus including
      (a) image pickup means, and
      (b) first means for outputting an image signal from said image pickup means; and
   (B) a signal processing apparatus including
      (a) second means for inputting the image signal from said first means,
      (b) changing means for changing a frame rate of the image signal from said second means,
      (c) an arithmetic operating apparatus for performing a process to the image signal, and
      (d) control means for controlling a changing operation of said changing means, said control means controlling the changing operation of said changing means according to a control signal from said arithmetic operating apparatus, which is a signal other than the image signal from said second means.

2. A system according to claim 1, further comprising:
   a recording apparatus for recording the image signal from said first means.

3. A system according to claim 2, wherein
   said second means further outputs the image signal of the frame rate changed by said changing means, and
   said first means further inputs the image signal outputted from said second means.

4. A system according to claim 3, wherein
   said first means can output the image signal inputted through said second means, and
   said recording apparatus can also record the image signal outputted from said first means through said second means.

5. A system according to claim 4, wherein
   said signal processing apparatus further includes a memory for storing the image signal from said second means and compressing means for compressing an information amount of the image signal stored in said memory,
   and said second means outputs the image signal compressed by said compressing means.

6. A system according to claim 4, wherein
   said first means also inputs the image signal read out from said recording apparatus, and
   said second means can input the image signal read out from said recording apparatus through said first means.

7. A system according to claim 1, wherein
   said signal processing apparatus has third means for outputting the image signal whose frame rate was changed by said changing means, and
   said arithmetic operating apparatus executes the process to the image signal from said third means.

8. A system according to claim 7, wherein
   said arithmetic operating apparatus includes display means for displaying an image according to the image signal from said third means and instructing means for instructing to said control means.

9. An imaging apparatus comprising:
   (a) image pickup means;
   (b) memory means for storing an image signal from said image pickup means;
   (c) compressing means for compressing an information amount of the image signal from said memory means;
   (d) recording means for recording the image signal from said memory means and the image signal compressed by said compressing means to a recording medium;
   (e) changing means for changing a frame rate of the image signal associated with at least one of said image pickup means, said memory means, said compressing means and said recording means;
   (f) control means for controlling a changing operation of said changing means; and
   (g) output means for outputting the image signal recorded by said recording means to an arithmetic operating apparatus, and
   wherein said control means controls a change amount of said frame rate in accordance with the frame rate at which the image signal can be processed by said arithmetic operating apparatus.

10. An imaging system comprising:
    (A) an image pickup apparatus;
    (B) a signal processing apparatus including
       (a) receiving means for receiving a video signal from said image pickup apparatus, and
       (b) control means for changing a frame rate of the video signal from said receiving means; and
       (c) operation means including setting means for setting the frame rate of the video signal, for performing an operation using the video signal,
       wherein said control means changes the frame rate of the video signal according to the frame rate set by said operation means.

11. A system according to claim 10, further comprising:
    a storing apparatus for storing the video signal from said image pickup apparatus.

12. A system according to claim 11, wherein said storing apparatus also stores the video signal output from said signal processing apparatus through said image pickup apparatus.

13. A system according to claim 12, wherein said signal processing apparatus includes compression means for compressing an information amount of the video signal from said image pickup apparatus, and said storing apparatus stores the video signal compressed by said compression means.

14. A system according to claim 13, wherein said signal processing apparatus includes a memory for storing the video signal from said image pickup apparatus, and said compression means compresses the information amount of the video signal stored in said memory.

15. A system according to claim 11, wherein said operation apparatus further includes designation means for designating start of storage of the video signal to said storing apparatus.

16. A system according to claim 10, wherein said operation apparatus includes display means for displaying an image associated with the video signal from said signal processing apparatus, and said setting means includes a designation member for setting the frame rate using the image displayed by said display means.

17. A system according to claim 10, wherein said operation means generates data indicating the frame rate set by said setting means and outputs said data to said signal processing apparatus during a blanking period of the video signal from said image pickup apparatus, and said control means changes the frame rate based upon said data indicating the frame rate.

18. An imaging system, comprising:
    (a) a video camera;
    (b) a processor for changing a frame rate of a video signal from said video camera;
    (c) a memory device for storing the video signal from said video camera; and (d) a computer for performing a processing using the video signal from said processor and setting the frame rate of the video signal, wherein said processor changes the frame rate of the video signal according to the frame rate set by said computer.

19. A system according to claim 18, wherein said memory device stores the video signal output from said processor through said video camera.

20. A system according to claim 18, wherein said processor also compresses an information amount of the video signal, and said memory device stores the compressed video signal output from said processor through said video camera.

21. A system according to claim 18, wherein said processor changes the frame rate of the video signal read out from said memory device through said video camera.

22. An imaging apparatus, comprising:
(A) an image pickup apparatus; and
(B) a signal processing apparatus including
   (a) receiving means for receiving a video signal from said image pickup apparatus,
   (b) control means for changing a frame rate of the video signal from said receiving means, and
   (c) output means for outputting the video signal to a computer,
wherein said control means includes detection means for detecting the frame rate of the video signal which can be processed by said computer, and changes the frame rate of the video signal according to result of detection of said detection means.

23. A system according to claim 22, wherein said control means changes the frame rate of the video signal so as to provide a largest frame rate which can be processed by said computer.

24. A system according to claim 22, further comprising:
a storing apparatus for storing the video signal from said image pickup apparatus.

25. A system according to claim 22, wherein said storing apparatus also stores the video signal output from said signal processing apparatus through said image pickup apparatus.

26. A system according to claim 25, wherein said signal processing apparatus includes compression means for compressing an information amount of the video signal from said image pickup apparatus, and said storing apparatus stores the video signal compressed by said compression means.

27. A system according to claim 26, wherein said signal processing apparatus includes a memory for storing the video signal from said image pickup apparatus, and said compression means compresses the information amount of the video signal stored in said memory.

* * * * *

UNITED STATES PATENT AND TRADEMARK OFFICE
CERTIFICATE OF CORRECTION

PATENT NO. : 5,640,202

DATED : June 17, 1997

INVENTORS : HIROSHI KONDO ET AL.

It is certified that error appears in the above-identified patent and that said Letters Patent is hereby corrected as shown below:

ON TITLE PAGE

[57] IN THE ABSTRACT
　　　Line 5,
　　　　"change" should read --changed--.

COLUMN 2

Line 40, "optical character recognition," should read --Optical Character Recognition (OCR),--.

COLUMN 3

Line 14, "a size" should read --the size--.

COLUMN 5

Line 5, "numeral 112 a" should read --numeral 112 denotes a--.

COLUMN 7

Line 36, "the same manner in" should read --in the same manner--.

UNITED STATES PATENT AND TRADEMARK OFFICE
CERTIFICATE OF CORRECTION

PATENT NO. : 5,640,202

DATED : June 17, 1997

INVENTOR : HIROSHI KONDO

It is certified that error appears in the above-identified patent and that said Letters Patent is hereby corrected as shown below:

<u>COLUMN 11</u>

Line 64, "a timing" should read --at a timing--.

<u>COLUMN 12</u>

Line 39, "exist" should read --exists--;
  Line 56, "remaining" should read --the remaining--.

<u>COLUMN 13</u>

Line 15, "of the" should read --The--;
  Line 38, "by after" should read --after--.

<u>COLUMN 14</u>

Line 3,  "be also" should read --also be--;
  Line 10, "signal" should read --signals--;
  Line 15, "be also" should read --also be--;
  Line 21, "be also" should read --also be--.

<u>COLUMN 15</u>

Line 15, "both of the" should read --both the--.

UNITED STATES PATENT AND TRADEMARK OFFICE
CERTIFICATE OF CORRECTION

PATENT NO. : 5,640,202

DATED : June 17, 1997

INVENTOR : HIROSHI KONDO

It is certified that error appears in the above-identified patent and that said Letters Patent is hereby corrected as shown below:

<u>COLUMN 18</u>

```
Line 36, "case" should read --the case--;
Line 43, "case" should read --the case--;
Line 52, "case" should read --the case--.
```

<u>COLUMN 19</u>

```
Line 23, "recorded to" should be deleted;
Line 58, "case" should read --the case--.
```

<u>COLUMN 21</u>

```
Lines 1-2, "be also" should read --also be--;
Line 18,  "be also" should read --also be--.
```

Signed and Sealed this

Twenty-fourth Day of February, 1998

Attest:

BRUCE LEHMAN

*Attesting Officer*   *Commissioner of Patents and Trademarks*